US012561667B1

(12) United States Patent
Quigley

(10) Patent No.: US 12,561,667 B1
(45) Date of Patent: *Feb. 24, 2026

(54) IDENTITY VERIFICATION USING PAYMENT INSTRUMENT(S)

(71) Applicant: Block, Inc., Oakland, CA (US)

(72) Inventor: Oliver S.C. Quigley, New York, NY (US)

(73) Assignee: Block, Inc., Oakland, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 18/368,364

(22) Filed: Sep. 14, 2023

Related U.S. Application Data

(63) Continuation of application No. 16/719,660, filed on Dec. 18, 2019, now Pat. No. 11,861,590.

(51) Int. Cl.
    *G06Q 20/32*     (2012.01)
    *G06Q 20/34*     (2012.01)
    *G06Q 20/40*     (2012.01)
(52) U.S. Cl.
    CPC ....... *G06Q 20/3278* (2013.01); *G06Q 20/341* (2013.01); *G06Q 20/401* (2013.01)
(58) Field of Classification Search
    CPC . G06Q 20/3278; G06Q 20/341; G06Q 20/401
    See application file for complete search history.

(56) References Cited

U.S. PATENT DOCUMENTS

| | | | | |
|---|---|---|---|---|
| 2012/0143706 A1* | 6/2012 | Crake | ............... | G06Q 20/3227 |
| | | | | 705/18 |
| 2016/0125396 A1* | 5/2016 | Brickell | ............... | G06Q 20/382 |
| | | | | 705/67 |
| 2016/0171202 A1* | 6/2016 | Goad | ..................... | H04W 4/80 |
| | | | | 726/5 |
| 2018/0069867 A1* | 3/2018 | Grajek | ..................... | G06N 7/00 |
| 2019/0164163 A1* | 5/2019 | Skordas | ............... | G06Q 50/265 |
| 2019/0364032 A1* | 11/2019 | Stöhr | ................... | H04L 9/3226 |

* cited by examiner

*Primary Examiner* — Christine M Tran
*Assistant Examiner* — Merritt J Hasbrouck
(74) *Attorney, Agent, or Firm* — Lee & Hayes, P.C.

(57) ABSTRACT

An identity verification system and method includes downloading a software layer to access an identifier from payment cards and cause a reader device to translate payment protocol data from the payment cards to security key protocol data. A request to access a computing resource may be received and the user may be prompted to cause an interaction between the payment card and the reader device. The software layer may translate data received from the payment card from a payment protocol to a security key protocol such that an identifier is identified in the security key protocol data. The user may be granted access to the computing resource of the application when the identifier is associated with the user.

20 Claims, 13 Drawing Sheets

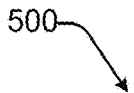

RECEIVE, AT A VERIFICATION CHALLENGER, A REQUEST TO
ACCESS A COMPUTING RESOURCE AVAILED VIA A USER
COMPUTING DEVICE, THE REQUEST BEING ASSOCIATED WITH
AN IDENTITY OF A USER
502

SEND, BY THE VERIFICATION CHALLENGER, A VERIFICATION
REQUEST TO THE USER COMPUTING DEVICE
504

RECEIVE, BY THE VERIFICATION CHALLENGER, A VERIFICATION
RESPONSE FROM A VERIFICATION RESPONDER, THE
VERIFICATION RESPONSE INCLUDING AN INDICATION OF AN
IDENTIFIER
506

DOES THE IDENTIFIER CORRESPOND TO THE
USER?
508

YES                                                                 NO

VERIFY, BY THE
VERIFICATION
CHALLENGER, THE
IDENTITY OF THE
USER
510

SEND, FROM THE
VERIFICATION
CHALLENGER, A
RESPONSE TO THE
REQUEST TO ACCESS
THE COMPUTING
RESOURCE
512

FIG. 5

Figure 9:
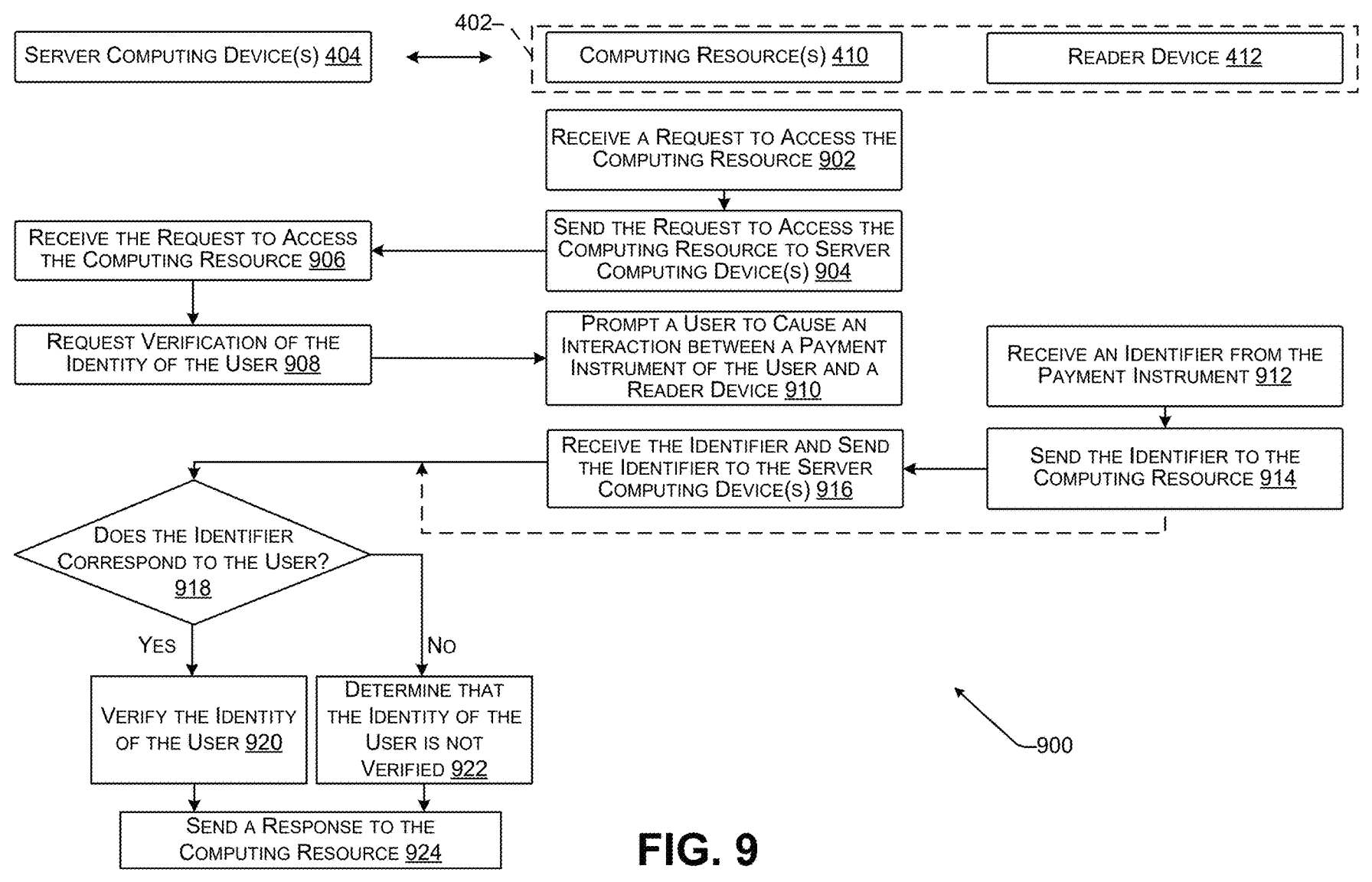

READER DEVICE 412

COMPUTING RESOURCE(S) 410

RECEIVE A REQUEST TO ACCESS THE COMPUTING RESOURCE 902

SEND THE REQUEST TO ACCESS THE COMPUTING RESOURCE TO SERVER COMPUTING DEVICE(S) 904

PROMPT A USER TO CAUSE AN INTERACTION BETWEEN A PAYMENT INSTRUMENT OF THE USER AND A READER DEVICE 910

RECEIVE AN IDENTIFIER FROM THE PAYMENT INSTRUMENT 912

SEND THE IDENTIFIER TO THE COMPUTING RESOURCE 914

RECEIVE THE IDENTIFIER AND SEND THE IDENTIFIER TO THE SERVER COMPUTING DEVICE(S) 916

SERVER COMPUTING DEVICE(S) 404

RECEIVE THE REQUEST TO ACCESS THE COMPUTING RESOURCE 906

REQUEST VERIFICATION OF THE IDENTITY OF THE USER 908

DOES THE IDENTIFIER CORRESPOND TO THE USER? 918

NO

DETERMINE THAT THE IDENTITY OF THE USER IS NOT VERIFIED 922

YES

VERIFY THE IDENTITY OF THE USER 920

SEND A RESPONSE TO THE COMPUTING RESOURCE 924

IDENTITY VERIFICATION USING PAYMENT INSTRUMENT(S)

RELATED APPLICATIONS

This application claims priority to and is a continuation of U.S. patent application Ser. No. 16/719,660, filed on Dec. 18, 2019, the entire contents of which are incorporated herein by reference.

TECHNICAL FIELD

Malicious actors and/or thieves can obtain passwords or other sensitive information via phishing or other scams. Multi-factor authentication (MFA) is a process that requires users to verify their identity using multiple (e.g., two, three, etc.) pieces of information. That is, first, a user can enter their name and password (i.e., a first factor) in an effort to gain access to their account. However, before gaining access to their account, the user is required to provide another piece of information (i.e., a second factor). After the user provides the second factor, the user is granted access to their account. Thus, with MFA, a compromise of a single factor may not enable a malicious actor in possession of the single factor from accessing the user's account.

An example of a second factor for MFA can be a hardware token. In some examples, a hardware token can be a key fob, a Universal Serial Bus (USB)-based device, or the like, which can be called a "security key." A security key can implement a form of multi-factor authentication known as Universal $2^{nd}$ Factor (U2F), which allows a user to complete a login process by inserting the security key into a port of a computing device and actuating a button on the security device (thereby providing something the user has to verify his or her identity). U2F is an open standard associated with the Fast IDentity Online (FIDO) Alliance, the specifications for which are available in the U2F 1.0 FIDO Alliance Proposed Standard of Oct. 9, 2014 and U2F 1.2 FIDO Alliance Proposed Standard of Apr. 11, 2017.

BRIEF DESCRIPTION OF THE DRAWINGS

Features of the present disclosure, its nature and various advantages, will be more apparent upon consideration of the following detailed description, taken in conjunction with the accompanying drawings.

FIG. 5 illustrates an example process for verifying an identity of a user as described herein.

FIG. 9 illustrates an example process for verifying an identity of a user using a payment instrument, wherein server computing device(s) are a verification challenger and at least one of a computing resource and/or a reader device is a verification responder, and wherein the reader device obtains an identifier via an interaction with a payment instrument.

FIG. 11 illustrates an example process for verifying an identity of a user using a payment instrument, wherein server computing device(s) are a verification challenger and at least one of a computing resource and/or a reader device is a verification responder, and wherein the reader device is associated with an identifier.

Figure 1:
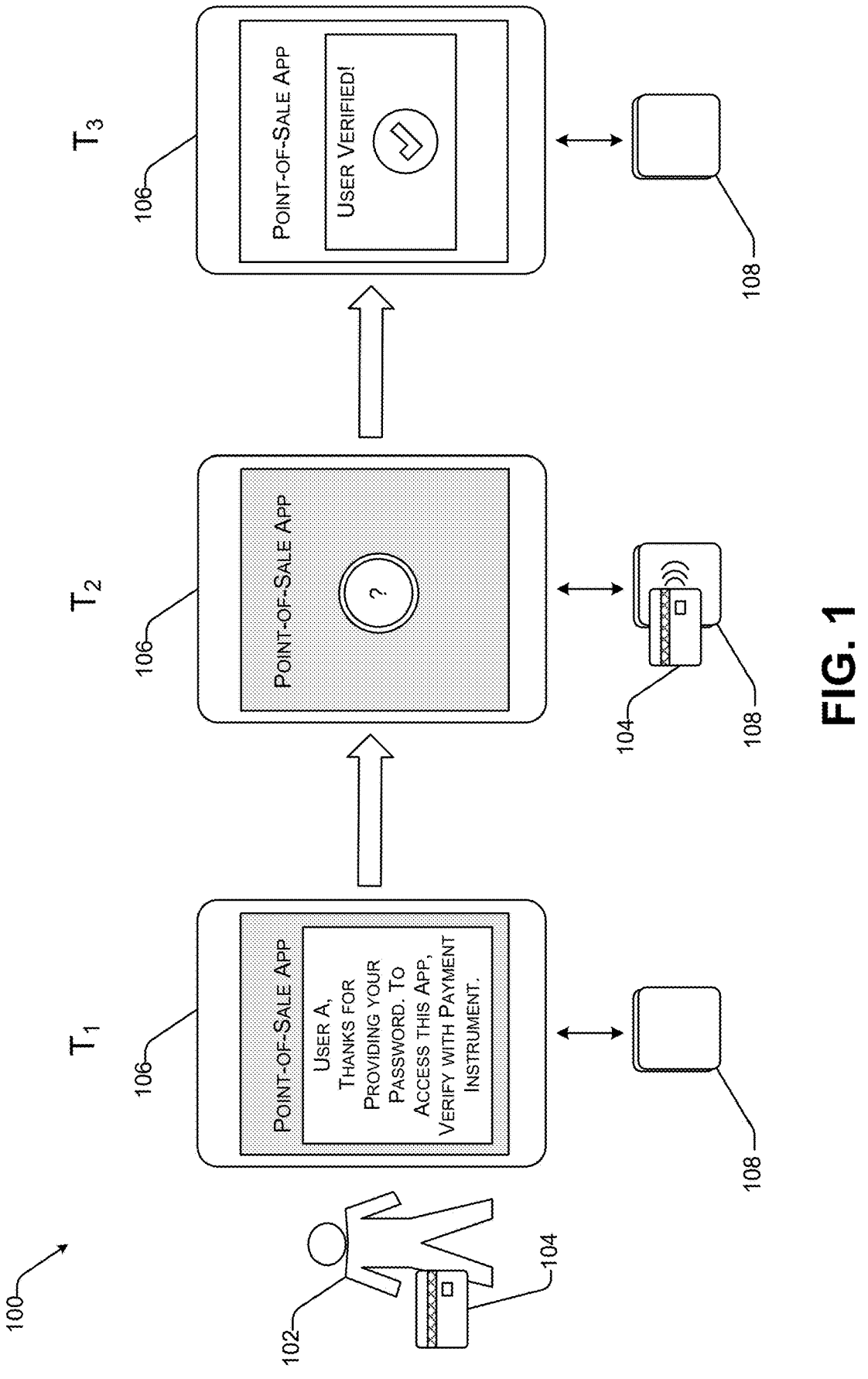
FIG. 1 illustrates an example environment for verifying an identity of a user using techniques described herein.

In the figures, the left-most digit(s) of a reference number identifies the figure in which the reference number first appears. The drawings are not to scale.

DETAILED DESCRIPTION

Techniques described herein are directed to identity verification using payment instrument(s). In an example, an identifier corresponding to a user can be associated with a microchip or other secure storage component of a payment instrument, such as a debit card or a credit card. The identifier can be a user-designated identifier, a private key, a Universal $2^{nd}$ Factor (U2F) identity credential derived by a U2F applet, or the like. A verifying entity—which can be a computing resource (e.g., an application, a web page, etc.) and/or server computing device(s) associated with a service provider—can receive a request to access the computing resource via a computing device operable by the user. The verifying entity can determine whether to grant the user access to the computing resource based on receiving the identifier via an interaction between the payment instrument and a reader device associated with the computing resource. For example, the verifying entity can receive the identifier via an interaction between the payment instrument and the reader device and, if the identifier corresponds to the user (e.g., the identifier is associated with a profile storing identification information of the user), the verifying entity can verify the identity of the user and grant the user access to the computing resource.

As described above, "security keys" can be used for multi-factor authentication (MFA). Such security keys, as described above, can be fobs, Universal Serial Bus (USB)-based devices, or the like. Security keys can be physically carried around by users using security keys for MFA.

Techniques described herein are directed to enabling users to use payment instruments, such as credit cards or debit cards, as security keys instead of fobs, USB-based devices, or the like. That is, techniques described herein enable users to utilize devices that are already carried around by the users for MFA purposes, thereby alleviating the need to carry around fobs, USB-based devices, or the like.

In an example, a service provider providing verification services can embed—or otherwise associate—an identifier in a microchip or other secure storage component associated with a payment instrument. In some examples, the identifier can be a static, user-designated identifier (e.g., an alphanumeric identifier provided by a user). In additional or alternative examples, the identifier can be a private key that is specific to the user and the payment instrument. In at least one example, the identifier can be a U2F identity credential, which can be derived by a U2F applet (e.g., a private key that is compliant with Fast IDentity Online (FIDO) Alliance specifications for U2F, which are available in the U2F 1.0 FIDO Alliance Proposed Standard of Oct. 9, 2014 and U2F 1.2 FIDO Alliance Proposed Standard of Apr. 11, 2017).

In at least one example, the payment instrument can be a payment card (e.g., a credit card, a debit card, etc.) that is enabled to communicate (e.g., send and/or receive data) via a near-field communications (NFC) network using NFC protocols. An example of such a payment card is a Europay Mastercard Visa (EMV) card. In at least one example, an NFC-enabled card can use existing antenna and/or circuitry to transmit an identifier associated with an NFC-enabled card to a reader device. In some examples, a non-NFC-enabled card can be used with a software layer that can be added to a reader device, which can translate between EMV and/or NFC (payment) protocol and the U2F (security key) protocol to access an identifier from such a (non-NFC-enabled) card and verify the identity of the corresponding user, as described herein. Such verification techniques can be useful for authenticating users requesting access to services of a service provider (e.g., that provides the cards and/or the reader device) and/or for authenticating users requesting to access services availed via third-party service providers (e.g., email service providers, banking service providers, etc.). By authenticating and/or verifying users as described herein-using payment instruments instead of security keys—the service provider(s) can determine whether to grant users access to their service(s).

As an example, a user may use a peer-to-peer payment service offered by a service provider. Using the peer-to-peer payment service, the user may be able to transfer funds from an account of the user that is managed by the service provider to another user that uses the peer-to-peer payment service. In some examples, the service provider can provide a payment instrument to the user so that the user can access funds in the account using the payment instrument. In at least one example, the service provider can associate an identifier with the payment instrument so that the payment instrument can be used for identity verification, as described herein. For instance, if the user desires to access an application on their mobile device that is associated with the peer-to-peer payment service, the application can prompt the user to verify their identity with the payment instrument. In such an example, the user can tap the payment instrument to their mobile device, which can include a reader device, and the reader device can read the identifier from the payment instrument. If the identifier corresponds to the user, the application can verify the identity of the user and grant the user access to the peer-to-peer payment service.

As another example, a user may use a payment processing service offered by a service provider. Using the payment processing service, the user may generate funds (e.g., from proceeds of transactions processed by the payment processing service) that are stored in an account of the user. The account can be managed by the service provider. In some examples, funds associated with the account can be transferred to a linked bank account of the user. In some examples, the funds can be maintained in the account and the service provider can provide a payment instrument to the user so that the user can access funds in the account using the payment instrument. In at least one example, the service provider can associate an identifier with the payment instrument so that the payment instrument can be used for identity verification, as described herein. For instance, if the user desires to access an application on a computing device that is associated with the payment processing service, the application can prompt the user to verify their identity with the payment instrument. In such an example, the user can swipe the payment instrument via a reader device associated with the computing device, and the reader device can read the identifier from the payment instrument. If the identifier corresponds to the user, the application can verify the identity of the user and grant the user access to the payment processing service. In at least one example, such an application can be a point-of-sale (POS) application, which is described below with reference to FIG. 1.

Techniques described herein enable payment instruments—such as credit cards and/or debit cards—to be used as security keys. That is, in multi-factor authentication, users can present payment instruments—which securely store information that is personal to the users (e.g., user-designated identifiers, private keys, U2F identity credentials, etc.)—as a factor for authentication. As such, techniques described herein enable users to protect themselves against thieves and/or malicious actors seeking to steal or improperly obtain information associated with such users. By enabling users to use payment instruments—which are regularly carried around by users—instead of conventional U2F hardware tokens, techniques described herein offer improvements to existing verification technology.

FIG. 1 illustrates an example environment 100 for verifying an identity of a user using techniques described herein. The environment 100 includes a user 102 that is associated with a payment instrument 104. The payment instrument 104 is illustrated as a payment card, such as a credit card, debit card, or the like. In at least one example, the payment card can be an NFC-enabled card that can use existing antenna and/or circuitry to transmit information stored thereon to a reader device (e.g., via an NFC network using NFC protocols). In additional or alternative examples, the payment instrument 104 may not be a card and, instead, may be a mobile device (e.g., running an application storing information associated with a payment instrument or otherwise storing such information), a wearable device (e.g., running an application storing information associated with a payment instrument or otherwise storing such information), etc. In at least one example, the payment instrument 104 can securely store information, such as payment data, identifier(s), and the like, on a microchip or other secure storage component. In some examples, such information can be stored in applications running on the payment instrument 104. Such applications can be called applets.

In at least one example, one or more applets can store payment data, which can include, but is not limited to, a name of the user 102, an address of the user 102, a type (e.g., credit, debit, etc.) of the payment instrument 104, a number associated with the payment instrument 104, a verification value (e.g., PIN Verification Key Indicator (PVKI), PIN Verification Value (PVV), Card Verification Value (CVV), Card Verification Code (CVC), etc.) associated with the payment instrument 104, an expiration date associated with the payment instrument 104, a primary account number (PAN) corresponding to the user 102 (which may or may not match the number associated with the payment instrument), restrictions on what types of charges/debts may be made, etc. In some examples, the payment data may be encrypted.

In some examples, one or more applets can store identifier(s) that can be used for identity verification as described herein. Such identifier(s), as described herein can be static identifier(s) (e.g., which can be designated by a user), cryptographic identifier(s) (e.g., associated with a private key), U2F identifier(s) (e.g., U2F identity credentials generated by a U2F applet), etc. Examples of identifier(s) securely stored in association with the payment instrument 104 are described below with reference to FIGS. 2 and 3.

In at least one example, the user 102 can interact with a user computing device 106 to access a computing resource availed via the user computing device 106. Such a computing device can include, but is not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. For the purpose of this discussion, a computing resource can be an application, a web page, a functionality and/or process associated with an application or a web page, or other resource that enables the user 102 to access service(s) associated with the computing resource via the user computing device 106. In at least one example, computing resources can be associated with service providers that avail the services associated with such computing resources. In some examples, such services are hosted by one or more server computing devices, as described below with reference to FIG. 4.

In FIG. 1, the user 102 intends to access a POS application (e.g., "POS app"), which can be associated with a service provider offering payment processing services. That is, the user 102 intends to access a computing resource that is a POS application. In at least one example, the POS application can configure the user computing device 106 as a POS terminal whereby the user 102 can process payments via the service provider. In at least one example, the service provider can provide the payment instrument 104 to the user 102 and/or can provide the user computing device 106 and/or a reader device 108 associated therewith. In other examples, the payment instrument 104, the user computing device 106, and/or the reader device 108 can be provided by a third-party entity and/or the POS application and/or computing resource can be provided by a third-party entity.

In at least one example, the user 102 can provide a first identification factor (e.g., a username and password) in association with a request to access the POS application. As described above, in some examples, the user 102 can provide an alternative factor (e.g., other than user name and password) as a first identification factor. To access the POS application, however, the user 102 may be prompted to verify his or her identity by causing the payment instrument 104 to interact with the reader device 108. In at least one example, the user computing device 106 can output, via a user interface, a request for the user 102 to present a payment instrument (e.g., cause an interaction between the payment instrument and the reader device 108) for identity verification purposes.

In at least one example, user computing device 106 can be associated with a reader device 108. In some examples, the reader device 108 can plug in to a port in the user computing device 106, such as a microphone port, a headphone port, an audio-jack, a data port, or other suitable port. In additional or alternative examples, the reader device 108 can be coupled to the user computing device 106 via another wired or wireless connection, such as via a Bluetooth®, Bluetooth® Low Energy (BLE), and so on (e.g., as illustrated in FIG. 1). In such examples, the reader device 108 can encrypt information received from the payment instrument 104 prior to passing it to the user computing device 106 (e.g., making it difficult for malicious actors to obtain unencrypted information).

In some examples, the reader device 108 can be integrated into the user computing device 106. In such examples, the reader device 108 can read information from the payment instrument 104 using NFC, radio-frequency identification (RFID), Bluetooth®, BLE, etc. technology that is embedded in the user computing device 106. Such technology can facilitate contactless payments. In at least one example, a functional component (e.g., instructions or programs that are executable by processor(s) associated with the reader device 108) can be configured to encrypt information received from the payment instrument 104 via NFC, RFID, Bluetooth®, BLE, etc. In such an example, the functional component "reads" the information from the payment instrument 104 as opposed to the dedicated hardware device 108 shown in FIG. 1 (and also described above). For the purpose of this discussion, however, the "reader device" can refer to dedicated hardware device(s), functional component(s) configured to read information from payment instruments, and/or a combination of the foregoing. Additional details associated with reader devices are described below with reference to FIG. 13.

In some examples, the reader device 108 may physically interact with payment instruments, for example, by swipes, dips, and/or taps. A swipe is an interaction where a user slides a payment card having a magnetic strip through a reader device that captures payment data contained in the magnetic strip. A dip is an interaction where a user inserts a payment card having an embedded microchip (i.e., chip) into a reader device chip-side first. The payment card remains in the reader device until the reader device prompts the user to remove the payment card. In some examples, while the card is in the reader device, the microchip can create a code which can be sent from a POS system to server computing device(s) associated with a service provider, a bank, and/or a card payment network (e.g., Mastercard®, VISA®, etc.) to be matched with another code. In some examples, such "codes" can be signatures using public-key cryptography and/or symmetric cryptography. A tap is an interaction where a user may tap or hover a payment instrument, such as an NFC-enabled electronic device or an NFC-enabled payment card, over a reader device to transmit information stored on the payment instrument via NFC protocols. In some examples, additional or alternative short-range communication technologies (e.g., RFID, Bluetooth®, BLE, etc.) can be used with tap interactions. In some examples, a tap may also be called a contactless payment. In at least one example, the reader device 108 can obtain information that is stored on the payment instrument 104 via one or more of the interactions described above (e.g., swipe, dip, tap, etc.).

In at least one example, based at least in part on the user 102 requesting to access the POS application (e.g., as shown at $T_1$), the user 102 can be prompted (e.g., by the user computing device 106) to cause the payment instrument 104 to interact with the reader device 108. As such, the user 102 can cause the payment instrument 104 to interact with the reader device 108 (e.g., illustrated in FIG. 1 as a tap). Based at least in part on the payment instrument 104 interacting with the reader device 108 (e.g., as shown at $T_2$), information stored in association with the payment instrument 104 (e.g., on a microchip associated therewith) can be read from the payment instrument 104. In some examples, as described above, the payment instrument 104 can store an identifier and thus, the identifier can be read by the reader device 108 (e.g., from the payment instrument 104). In at least one example, a verifying entity—which can be the POS application and/or server computing device(s) (e.g., associated with the service provider) can compare the identifier (e.g., read from the reader device 108) with a profile of the user 102 to determine whether the identifier corresponds to the profile of the user 102. If the identifier is associated with the profile of the user 102, the verifying entity can verify the identity of the user 102 and can grant the user 102 access to the POS application (e.g., as shown at $T_3$).

As an example, the user 102 can be an employee (or other agent) of a seller that uses payment processing services of the service provider for processing transactions between the seller and buyers. To access such services, the employee can log-in (e.g., provide a username and password) to the POS application. To ensure that the employee is actually the employee (i.e., verify the identity of the employee), the POS application and/or the server computing device(s) associated with the service provider can prompt the user 102 for a second identification factor, which can include verification via a payment instrument. As such, the user 102 can cause an interaction between the payment instrument 104 and the reader device 108. So long as an identifier associated with the payment instrument 104 corresponds to the user 102, the POS application and/or the server computing device(s) can verify the identity of the user 102 and grant the user 102 access to the POS application. As such, the user 102 can conduct transactions on behalf of the seller, payment for which can be processed by the payment processing service.

FIG. 1 illustrates a non-limiting example of an environment for verifying an identity of a user 102 and granting a user 102 access to a computing resource. As described above, while a POS application is illustrated as the computing resource in FIG. 1, a computing resource can be any application, web page, a function and/or process associated with an application or a web page, or the like, which can be associated with the service provider described above or a third-party service provider. That is, the same or similar process can be applicable for authenticating a user looking to access computing resources including, but not limited to, an inventory management application, web page, user interface, etc.; a catalog management application, web page, user interface, etc.; a business banking application, web page, user interface, etc.; a financing application, web page, user interface, etc.; a lending application, web page, user interface, etc.; a reservation management application, web page, user interface, etc.; an estimating application, web page, user interface, etc.; an invoice application, web page, user interface, etc.; a web-development application, web page, user interface, etc.; a payroll application, web page, user interface, etc.; an employee management application, web page, user interface, etc.; an appointment application, web page, user interface, etc.; a loyalty tracking application, web page, user interface, etc.; a restaurant management application, web page, user interface, etc.; an order management application, web page, user interface, etc.; a fulfillment application, web page, user interface, etc.; a peer-to-peer payment application, web page, user interface, etc.; an onboarding application, web page, user interface, etc.; an identity verification (IDV) application, web page, user interface, etc.; an email application, web page, user interface, etc.; a social networking application, web page, user interface, etc.; a cloud storage application, web page, user interface, etc.; a telecommunications application, web page, user interface, etc.; and the like.

Furthermore, while FIG. 1 describes using a payment instrument 104 for identity verification for granting access to a computing resource, techniques described herein can be used for identity verification for any purpose.

Figure 2:
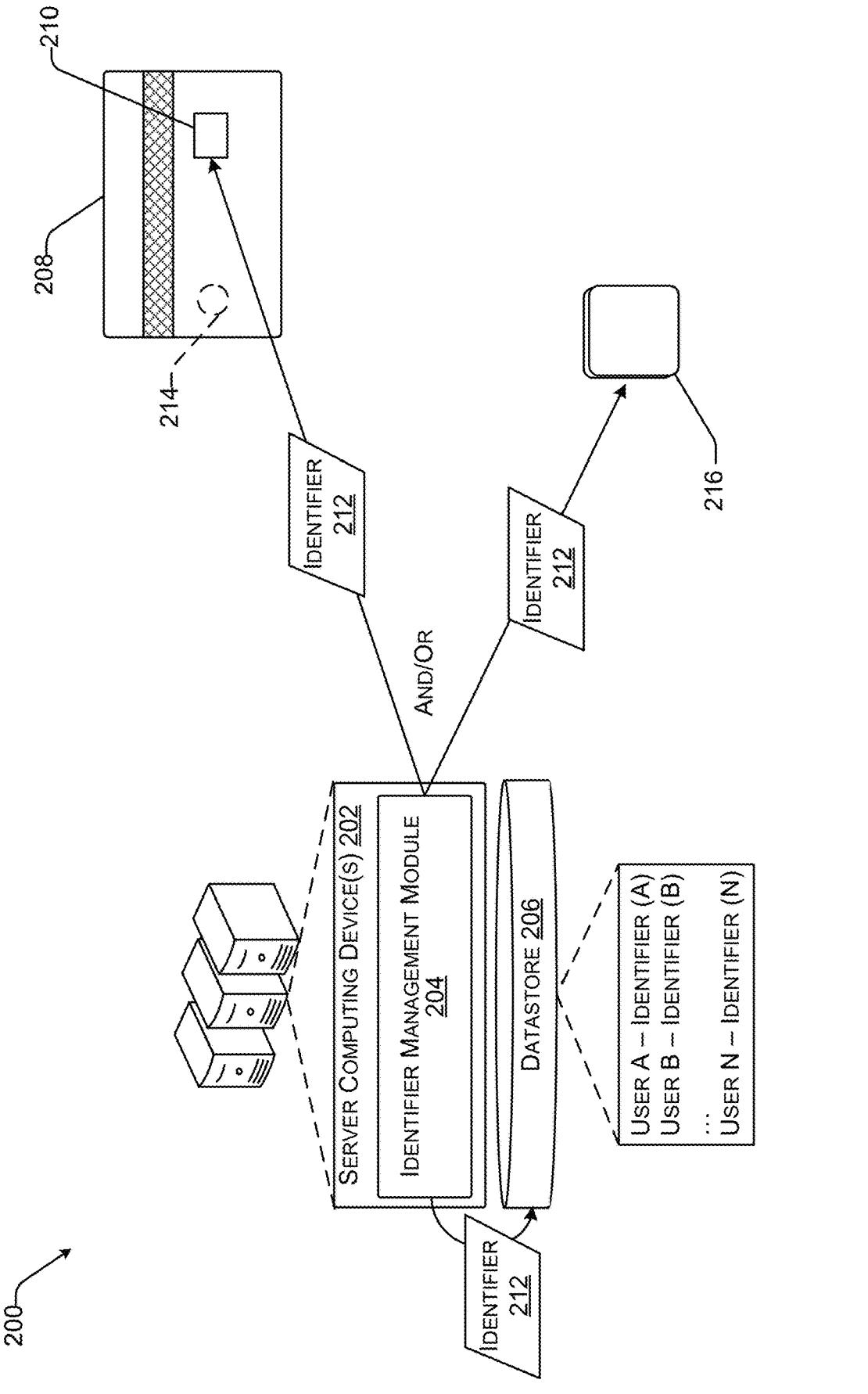
FIG. 2 illustrates an example environment for associating an identifier with a payment instrument.

FIG. 2 illustrates an example environment 200 for associating an identifier with a payment instrument. In at least one example, server computing device(s) 202 can be associated with one or more functional components, such as an identifier management module 204. Functional components can comprise instructions or programs that are executable by processor(s) associated with the server computing device(s) 202 and that, when executed, specifically configure the server computing device(s) 202 to perform the actions attributed thereto. In at least one example, the identifier management module 204 can determine identifier(s), cause identifier(s) to be associated with payment instrument(s) and/or reader device(s), and/or associate identifier(s) with respective user profile(s). Additional details are provided below.

In at least one example, the server computing device(s) 202 can be associated with a datastore 206. The datastore 206, which can be integrated with the server computing device(s) 202 and/or otherwise accessible to the server computing device(s) 202, can store data including, but not limited to profile data. Profile data can be associated with profiles of user(s), which can include seller(s), buyer(s), employer(s), employee(s), payor(s), payee(s), and the like. In at least one example, the profile data can include identifying information (e.g., name, user name, demographic information, etc.), verification information (e.g., password(s), identifier(s) associated with payment instrument(s) and/or reader device(s), etc.), and the like. The datastore 206 can store additional or alternative types of data as described herein.

As described above, a payment instrument 208, which can correspond to the payment instrument 104 described above with reference to FIG. 1, can be a smart card (also known as an NFC card) that contains micro-processor(s) and memory. That is, in at least one example, the payment instrument 208 can be associated with a microchip 210 or other secure storage component. In some examples, the microchip 210 can be embedded in the payment instrument 208, for example, in an EMV card. In at least one example, the microchip 210 can have an operating system and applications (called applets), as described above, that are capable of performing complex operations and/or securely storing data that is accessible to other computing devices (e.g., a reader device). In at least one example, the identifier management module 204 can send an identifier 212, or indication thereof, to the microchip 210 or other secure storage component of the payment instrument 208. In additional or alternative examples, the payment instrument 208 (e.g., an applet runnable thereon) can generate an identifier 212.

In some examples, the identifier 212 can be a static identifier. In at least one example, the identifier 212 can be designated by a user associated with the payment instrument 208. For example, the identifier 212 can be a user-designated alphanumeric identifier that is associated with the payment instrument 208 and/or an account of the user, that in some examples, can be managed by a service provider as described herein. In such examples, the user-designated alphanumeric identifier, or an indication thereof, can be read by a reader device (e.g., the reader device 108 in FIG. 1) responsive to an interaction between the payment instrument 208 and the reader device. The user-designated alphanumeric identifier, or the indication thereof, can be used to verify the identity of the corresponding user.

In some examples, the identifier 212 may not be designated by the user and, instead, may be payment data that is associated with the payment instrument 208. In such examples, the identifier management module 204 may not need to send the identifier 212 to the payment instrument 208.

In an additional or alternative example, the identifier can be a private key, that can be paired with a public key, for encrypting (and decrypting) data. In at least one example, when the payment instrument 208 interacts with a reader device (e.g., the reader device 108 in FIG. 1), the payment instrument 208 can transmit data that is signed by the private key to the reader device. In some examples, the reader device can transmit the unsigned data to the payment instrument 208 during the interaction, at which time the payment instrument 208 can sign the data and return the signed data to the reader device. In such an example, the signed data (e.g., which can be an indication of the identifier 212) can be used to verify the identity of the corresponding user (e.g., by signing the data with the private key, the payment instrument proves that the payment instrument has the private key). Additional details are described below.

In some examples, the identifier 212 can be a U2F identity credential, which can be derived by a U2F applet. That is, in at least one example, the identifier 212 can be a private key that is compliant with FIDO Alliance specifications for U2F, which are available in the U2F 1.0 FIDO Alliance Proposed Standard of Oct. 9, 2014 and U2F 1.2 FIDO Alliance Proposed Standard of Apr. 11, 2017. In such examples, the identifier management module 204 may not send the identifier 212 to the payment instrument 104; the U2F applet can generate the identifier 212 (e.g., U2F identity credential) via implementation of the U2F applet. In such an example, when the payment instrument 208 interacts with a reader device (e.g., the reader device 108 in FIG. 1), the payment instrument 208 can transmit the U2F identity credential, or an indication associated therewith, to the reader device, which can be used to verify the identity of the corresponding user. Additional details are described below.

Based at least in part on the identifier 212 being provided to the payment instrument 208, the identifier 212 can be stored on the microchip 210 and/or in a secure storage component associated with the payment instrument 208. As described above, in at least one example, the identifier 212 can be stored in an applet associated with the microchip 210. Additionally, based at least in part on providing the identifier 212 to the payment instrument 208, the identifier management module 204 can associate the identifier 212 with a profile of the user with whom the payment instrument is associated. A non-limiting example of a portion of the datastore 206 is illustrated, which includes identifiers that are mapped to, or otherwise associated with, individual users (e.g., profiles associated therewith).

In at least one example, the payment instrument 208 can be associated with an actuation mechanism 214 (e.g., a button, a sensor, etc.). In an example, the actuation mechanism 214 can be associated with a capacitive sensor that is across an EMV contact pad of an EMV card such that an interaction with the pad reads as a button push (actuation of the actuation mechanism 214). The actuation mechanism 214, when actuated, can provide an indication that the user intends to use the payment instrument for verification purposes. That is, in some examples, a reader device can refrain from reading information associated with the payment instrument 208 and/or transmitting the information associated with the payment instrument 208 (e.g., to a verifying entity) until the actuation mechanism 214 is actuated.

In some examples, the identifier 112 may be provided to a reader device 216, which can correspond to the reader device 108 described above with reference to FIG. 1, instead of, or in addition to, being provided to the payment instrument 208. For example, in an example where the reader device 216 stores the identifier 112, and the identifier 112 is a static identifier, the reader device 216 can send the static identifier to the verifying entity. In an example where the reader device 216 stores the identifier 112, and the identifier 112 is a private key, the reader device 216 can sign data using the private key and send the signed data to the verifying entity. Furthermore, in an example where the reader device 216 stores the identifier 112, and the identifier 112 is a U2F identity credential (e.g., derived by a U2F applet), the reader device 216 can transmit the U2F credential to the verifying entity. Additional details are described below.

Figure 3:
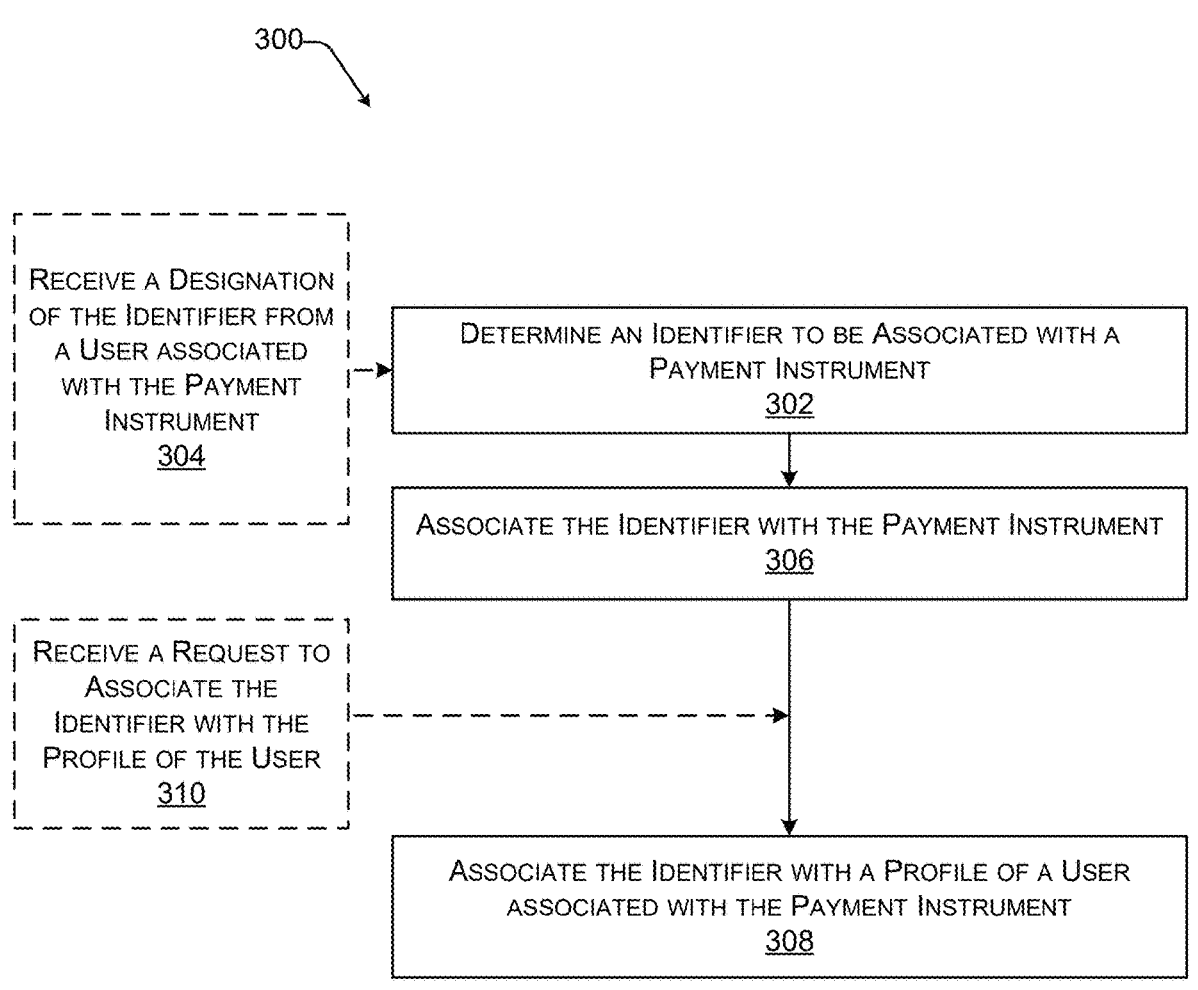
FIG. 3 illustrates an example process for associating an identifier with a payment instrument and/or a profile of a user.

FIG. 3 illustrates an example process 300 for associating an identifier with a payment instrument and/or a profile of a user. The process 300 is described with reference to FIG. 2 for convenience and ease of understanding. However, the process 300 is not limited to being performed using components described in FIG. 2, and such components are not limited to performing the process illustrated in FIG. 3.

The process 300 is illustrated as a collection of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely.

At operation 302, the identifier management module 204 can determine an identifier to be associated with a payment instrument. In some examples, the identifier can be a static identifier, such as a user-designated identifier that can be designated by a user associated with the payment instrument. For example, the identifier can be a user-designated alphanumeric identifier that is associated with the payment instrument and/or an account of the user, that in some examples, can be managed by a service provider as described herein. That is, in at least one example, the identifier management module 204 can receive a designation of the identifier from a user associated with the payment instrument, as illustrated at operation 304, prior to determining the identifier to be associated with the payment instrument.

As described above, in an additional or alternative example, the identifier can be a private key, that can be paired with a public key, for encrypting (and decrypting) data. In such an example, the identifier management module 204 can determine the private key/public key pair and the private key to be sent to the payment instrument for storage thereon. In an additional or alternative example, the identifier management module 204 can receive the private key/public key pair, for example from a third-party service provider, and can determine the private key/public key pair based at least in part thereon.

Furthermore, in some examples, the identifier can be a U2F identity credential, which can be derived by a U2F applet. In at least one example, the identifier management module 204 can determine the U2F identity credential to associate with the payment instrument. In an additional or alternative example, the identifier management module 204 can receive the U2F identity credential, for example from a third-party service provider, and can determine the U2F identity credential based at least in part thereon. In some examples, the identifier can be generated by the U2F applet (e.g., instead of by the identifier management module 204) on the payment instrument and can be provided to the identifier management module 204.

At operation 306, the identifier management module 204 can associate the identifier with the payment instrument. In at least one example, the identifier management module 204 can send an identifier, or indication thereof, to the payment instrument, thereby associating the identifier with the payment instrument. When the identifier is provided to the payment instrument, the identifier can be stored on a microchip and/or in a secure storage component associated with the payment instrument and can be used for verification purposes as described herein.

At operation 308, the identifier management module 204 can associate the identifier with a profile of a user associated with the payment instrument. Based at least in part on providing the identifier to the payment instrument (thereby associating the identifier with the payment instrument), the identifier management module 204 can associate the identifier with a profile of the user with whom the payment instrument is associated. The identifier can be stored in the profile and subsequently accessed to verify an identity of the corresponding user.

In some examples, the identifier management module 204 can associate the identifier with the profile of the user automatically (e.g., without input from the user). For instance, if the user is associated with a profile, the identifier management module 204 can associate the identifier with the profile of the user prior to, or concurrently with, sending the identifier to the payment instrument. In other examples, the identifier management module 204 can receive a request to associate the identifier with the profile of the user, as illustrated at operation 310, and the identifier management module 204 can associate the identifier with the profile of the user responsive to receiving such a request. In some examples, such a request can be associated with a request to generate a profile for the user (e.g., if the user is a new user and/or otherwise does not have a profile associated therewith) and/or register a payment instrument for verification services.

As described above with reference to FIG. 2, in some examples, the reader device 216 can store the identifier 212. In such examples, the process 300 can be implemented as described, but instead of determining an identifier to be associated with a payment instrument (e.g., at operation 302), associating the identifier with the payment instrument (e.g., at operation 304), and so on, the identifier can be determined for a reader device, associated with the reader device, and so on.

Figure 4:
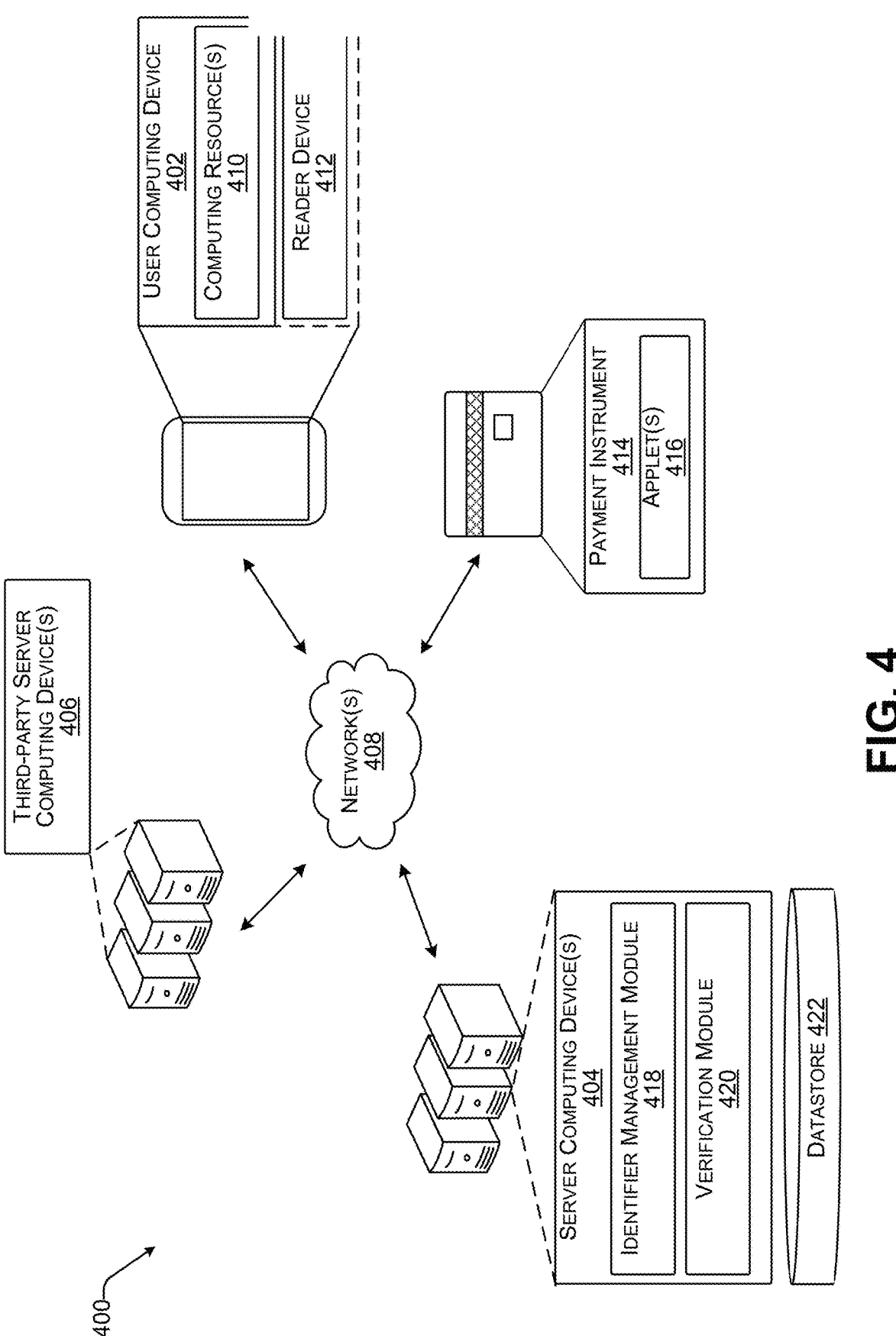
FIG. 4 illustrates an example system for facilitating identity verification using payment instruments as described herein.

FIG. 4 illustrates an example system 400 for facilitating identity verification using payment instruments as described herein. In the system 400, a user computing device 402 can communicate with server computing device(s) 404 and/or third-party server computing device(s) 406 via network(s) 408 (e.g., the Internet, cable network(s), cellular network(s), cloud network(s), wireless network(s) (e.g., Wi-Fi) and wired network(s), as well as close-range communications such as Bluetooth®, BLE, and the like).

The user computing device 106 described above with reference to FIG. 1 can correspond to the user computing device 402. While FIGS. 1 and 4 describe a single user computing device, in some examples, a user can interact with multiple computing devices, for example in a POS system that includes a buyer-facing device and a seller-facing device. In at least one example, the user computing device 402 can be associated with computing resource(s) 410, which can include application(s), web page(s), a functionality and/or process associated with application(s) or web page(s), and/or any other resource that enables a user to access service(s) availed thereby. In at least one example, the computing resource(s) 410 can avail user interface(s) to enable a user to interact with the computing resource(s) 410 via respective user interface(s).

In at least one example, the user computing device 402 can include or be associated with a reader device 412 (which can correspond to the reader device 108 described above with reference to FIG. 1 and the reader device 216 described above with reference to FIG. 2). As described above, in some examples, the reader device 412 can plug in to a port in the user computing device 106, such as a microphone port, a headphone port, an audio-jack, a data port, or other suitable port. In additional or alternative examples, the reader device 412 can be coupled to the user computing device 106 via another wired or wireless connection, such as via a Bluetooth®, BLE, and so on. In some examples, the reader device 412 can be integrated into the user computing device 106. As described above, the reader device 412 can obtain information that is stored on a payment instrument via an interaction (e.g., swipe, dip, tap, etc.).

In at least one example, the reader device 412 can communicate (e.g., send and/or receive data) with one or more payment instruments, such as a payment instrument 414. In at least one example, the payment instrument 414 can be a smart card (also known as an NFC card) that contains micro-processor(s) and memory. That is, in at least one example, the payment instrument 414 can be associated with a microchip or other secure storage component. In at least one example, the payment instrument 414 can have an operating system and application(s) (called applet(s) 416), as described above, that are capable of performing complex operations and/or securely storing data that is accessible to other computing devices (e.g., the reader device 412). In at least one example, the operating system and applet(s) 416 can be stored on a microprocessor associated with the payment instrument 414. In at least one example, one or more of the applet(s) 416 can store identifier(s) as described herein.

In some examples, the reader device 412 can be configured to perform an application selection process to indicate to the payment instrument 414 which of the applet(s) 416 it desires to read information from. That is, as described above, the payment instrument 414 can have multiple applet(s) 416 runnable thereon and the reader device 412 can send a command to the payment instrument 414 that indicates an application identifier (AID) associated with the desired applet. In at least one example, the reader device 412 can receive an instruction from the user computing device 402 (e.g., a computing resource associated therewith) that indicates which applet to read from. Responsive to the reader device 412 sending the command (and the payment instrument 414 receiving the command), the payment instrument 414 can select the appropriate applet and provide a response to the reader device 412 so that the reader device 412 can read data from the correct applet. Additional details associated with application selection are described in ISO/IEC 7816.

In at least one example, the user computing device 402 can communicate (e.g., send and/or receive data) with the server computing device(s) 404 via the network(s) 408. In some examples, the server computing device(s) 404 can include functional components including, but not limited to, an identifier management module 418 (e.g., which corresponds to the identifier management module 204 described above with reference to FIG. 2) and a verification module 420. In at least one example, the verification module 420 can send verification request(s), receive verification response(s), and determine whether an identity of a user is verified based at least in part on the verification response(s). In at least one example, the server computing device(s) 404 can be associated with a datastore 222 (e.g., which corresponds to the datastore 206 described above with reference to FIG. 2).

In some examples, the server computing device(s) 404 can be associated with a service provider that provides one or more services, including but not limited to, payment processing services, inventory management services, catalog management services, business banking services, financing services, lending services, reservation management services, estimating services, invoice services, web-development services, payroll services, employee management services, appointment services, loyalty tracking services, restaurant management services, order management services, fulfillment services, peer-to-peer payment services, onboarding services, identity verification (IDV) services, and so on. In at least one example, the computing resource(s) can enable a user to access the service(s) described above via the user computing device 402.

Furthermore, as described above, in some examples, the user computing device 402 can communicate (e.g., send and/or receive data) with third-party server computing device(s) 406 via the network(s) 408. The third-party server computing device(s) 406 can be associated with service provider(s) that are different than the service provider described above and that offer additional or alternative services than those described above. In some examples, the computing resource(s) can be availed via the third-party service provider(s). As a non-limiting example, the third-party service providers can provide email services, social networking services, cloud storage services, telecommunication services, etc.

FIG. 5 illustrates an example process 500 for verifying an identity of a user as described herein. The process 500 is described with reference to FIG. 4 for convenience and ease of understanding. However, the process 500 is not limited to being performed using components described in FIG. 4, and such components are not limited to performing the process illustrated in FIG. 5.

The process 500 is illustrated as a collection of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely.

At operation 502, a verification challenger can receive a request, which can be associated with an identity of a user, to access a computing resource that is availed via a user computing device. In at least one example, a user can desire to access service(s) availed via a computing resource (of the computing resource(s) 410). As described above, a computing resource can be an application, a web page, a functionality and/or process associated with an application or a web page, or other resource that enables users to access service(s) of a service provider. In at least one example, the user can interact with a user interface presented by the computing resource (e.g., via the user computing device 402) to request access to the computing resource. In some examples, the user can provide a first identification factor (e.g., a username, a password, etc.). As such, in at least one example, the request to access the computing resource can be associated with an identity of the user, or an indication thereof. In at least one example, responsive to the user requesting access to the computing resource, a verification challenger can receive the request. The verification challenger can be the computing resource or server computing device(s), such as the server computing device(s) 404 or the third-party server computing device(s) 406, which can depend on the service provider associated with the computing resource with which the user desires to access. Additional details associated with the verification challenger are described below with reference to FIGS. 6-11.

At operation 504, the verification challenger can send a verification request to the user computing device. In at least one example, the verification request can be a "challenge" for a verification responder to provide an identifier, or an indication thereof, associated with the user. In at least one example, the verification challenger can send the verification request to the user computing device 402 and, responsive to receiving the verification request, the user computing device 402 can output a prompt requesting the user provide an identifier. In some examples, the prompt can request that the user cause an interaction between a payment instrument 414 and a reader device 412 associated with the user computing device 402. In an alternative example, the user computing device 402 can output a prompt requesting the user to provide an identifier via another source, such as the reader device 412. In some examples, the user computing device 402 may not specify the source of the identifier in the verification request.

At operation 506, the verification challenger can receive a verification response from a verification responder. The verification response can include an identifier and/or indication thereof. In at least one example, the user can cause an interaction between a payment instrument 414 and the reader device 412. As described above, the payment instrument 414 can be associated with an identifier that can be read by the reader device 412 responsive to the interaction between the payment instrument 414 and the reader device 412. That is, in at least one example, the payment instrument

414 can provide the response to the challenge via an interaction with the reader device 412. In some examples, the verification responder can be the reader device 412, and the reader device 412 can send the identifier to the verification challenger. In some examples, the verification responder can be the computing resource, which can receive the identifier from the reader device 412, and the computing resource can send the identifier to the verification challenger.

In some examples, the reader device 412 can provide the response to the challenge. In at least one example, a payment instrument 414 may not be associated with an identifier (e.g., via the processes described above with reference to FIGS. 2 and 3) and/or an identifier can additionally or alternatively be associated with the reader device 412, and in such examples, the reader device 412 can determine an identifier based on an interaction between a payment instrument 414 and the reader device 412. In at least one example, the reader device 412 can store an identifier (e.g., instead of, or in addition to, a payment instrument 414), and the reader device 412 can send the identifier and/or an indication thereof to the verification challenger. In some examples, the reader device 412 can send the identifier and/or an indication thereof directly to the verification challenger and/or indirectly to the verification challenger (e.g., via a computing resource to server computing device(s)). Additional details associated with the verification responder are described below with reference to FIGS. 6-11.

At operation 508, the verification challenger can determine whether the identifier corresponds to the user. In some examples, the verification challenger can be the verification module 420 (e.g., associated with the server computing device(s) 404). In additional or alternative examples, the verification challenger can be the computing resource(s) 410. In at least one example, based at least in part on receiving the verification response, which includes an identifier and/or an indication thereof, the verification challenger can compare the identifier with a profile of the user to determine whether the identifier corresponds to the identifier associated with the profile of the user. Based at least in part on determining that the identifier corresponds to the user, the verification challenger can verify the identity of the user, as illustrated at operation 510. That is, if the identifier corresponds to the same user that the username and password identified, the verification challenger can verify the identity of the user.

At operation 512, the verification challenger can send a response to the request to access the computing resource. The verification challenger can send a response to the computing device, which can indicate that the identity of the user has been verified (as illustrated at operation 510) or that the identity of the user has not been verified. In some examples, the response can include an indication as to whether to grant the user access to the computing resource. In other examples, the computing resource can determine whether to grant the user access to the computing resource based at least in part on receiving the response from the verification challenger. Additional details are described below.

FIGS. 6-11 illustrate example processes wherein the verification challenger and/or the verification responder, described above with reference to FIG. 5, comprise different entities. The processes 600-1100 are described with reference to FIG. 4 for convenience and ease of understanding. However, the processes 600-1100 are not limited to being performed using components described in FIG. 4, and such components are not limited to performing the processes illustrated in FIGS. 6-11.

The processes 600-1100 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely.

Figure 6:
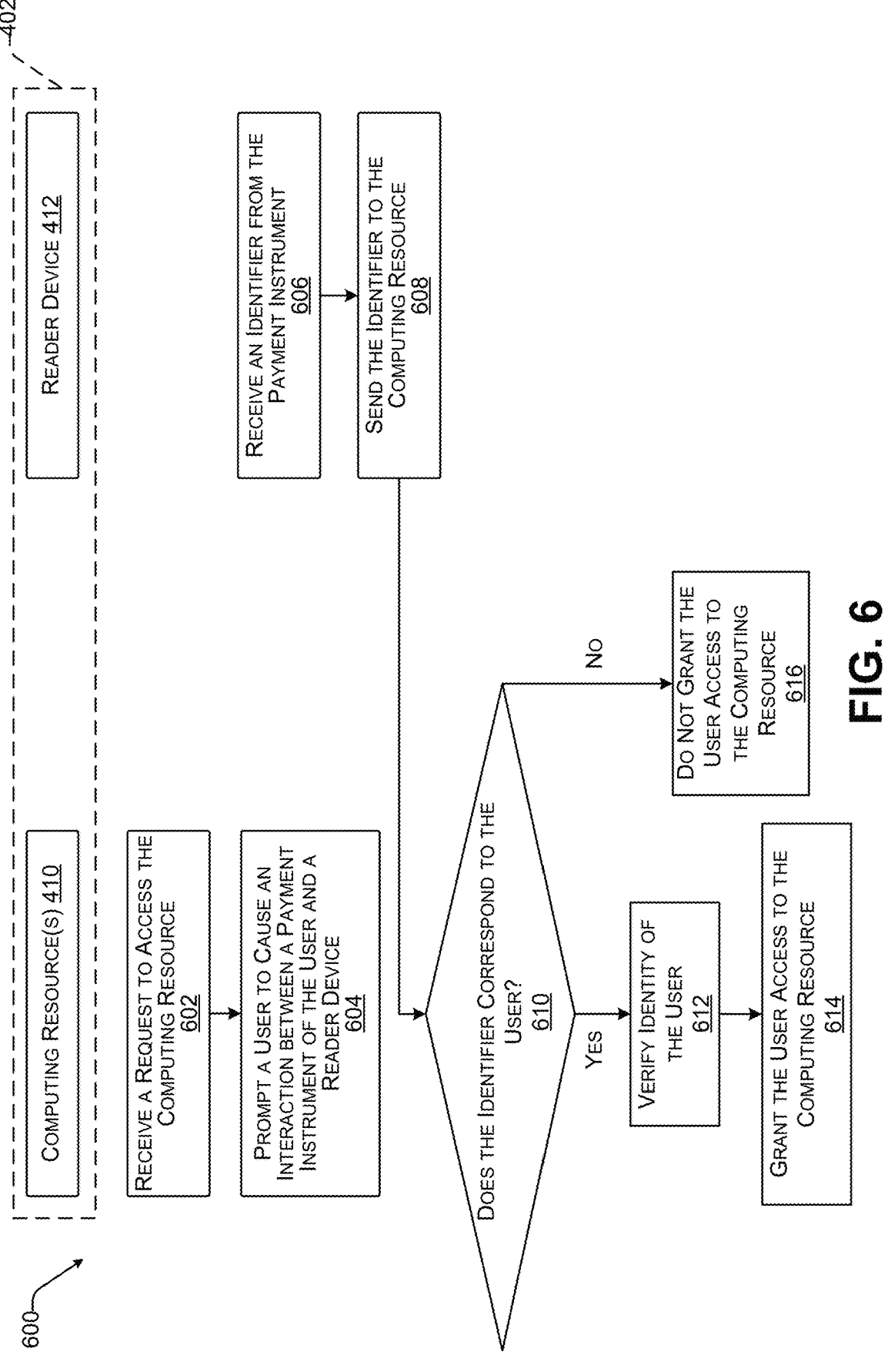
FIG. 6 illustrates an example process for verifying an identity of a user using a payment instrument, wherein a computing resource is a verification challenger and a reader device obtains an identifier via an interaction with a payment instrument.
Figure 7:
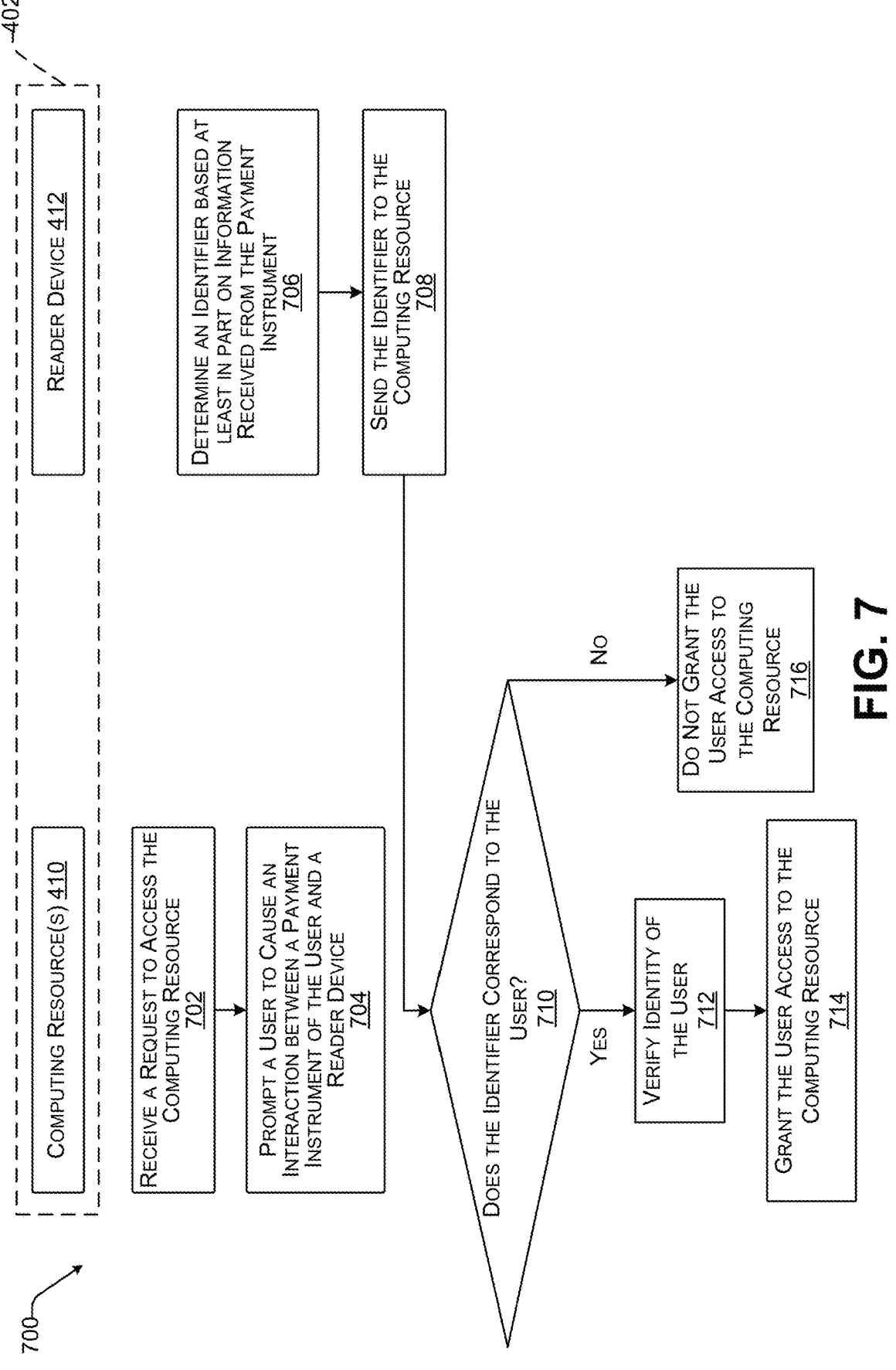
FIG. 7 illustrates another example process for verifying an identity of a user using a payment instrument, wherein a computing resource is a verification challenger and a reader device is a verification responder, and wherein the reader device determines an identifier based at least in part on an interaction with a payment instrument.
Figure 8:
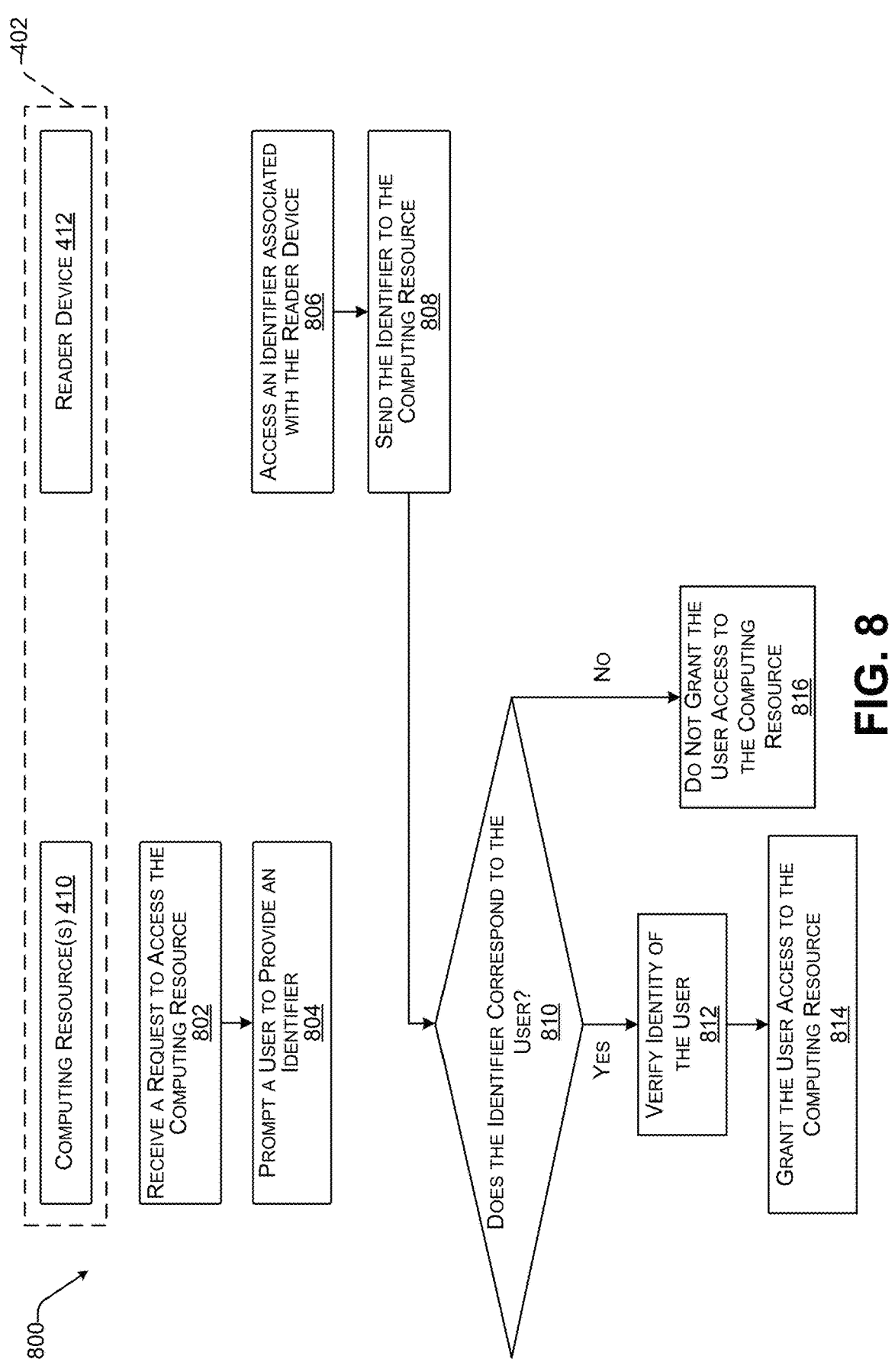
FIG. 8 illustrates an example process for verifying an identity of a user using a payment instrument, wherein a computing resource is a verification challenger and a reader device is a verification responder, and wherein the reader device is associated with an identifier.

With respect to FIGS. 6-8, operations illustrated under the computing resource(s) 410 can be performed by such computing resource(s) 410 and operations illustrated under the reader device 412 can be performed by the reader device 412. In an example, the computing resource(s) 410 and the reader device 412 can be associated with user computing device 106. As described above, in some examples, the reader device 412 can be integrated with the user computing device 106 or can be coupled to the user computing device 106 via a wired or wireless connection.

FIG. 6 illustrates an example process 600 for verifying an identity of a user using a payment instrument 414, wherein a computing resource is a verification challenger and a reader device is a verification responder, and wherein the reader device obtains an identifier via an interaction with a payment instrument 414.

At operation 602, a computing resource of the computing resource(s) 410 can receive a request (e.g., from a user) to access the computing resource. In an example, a user can interact with a user interface associated with the computing resource to provide a first identity factor (e.g., username and/or password) or otherwise request access to the computing resource. In at least one example, the request can be associated with an identity of the user, or an indication thereof (e.g., so that that verifying entity knows who to verify).

At operation 604, the computing resource can prompt the user to cause an interaction between a payment instrument 414 of the user and a reader device. In at least one example, responsive to the prompt, the user can cause an interaction between a payment instrument 414 and the reader device 412. In some examples, the user can cause an interaction between a payment instrument 414 and the reader device 412 without first being prompted to do so. In some examples, the reader device 108 may physically interact with payment instrument 414*s* such as magnetic stripe payment cards, EMV payment cards, and/or short-range communication (e.g., NFC, RFID, Bluetooth®, BLE, etc.) payment instrument 414*s* (e.g., cards or devices configured for tapping). For example, the user can dip a payment instrument 414 into the reader device 412, tap the payment instrument 414 on the reader device 412, or swipe the payment instrument 414 through the reader device 412. The reader device 412 can read information associated with the payment instrument 414, which in some examples, can be stored in a secured storage component (e.g., a microchip) associated with the payment instrument 414. As described above, the information can include an identifier that has been provided by a service provider, as described above with reference to FIGS. 2 and 3. As such, the reader device 412 can receive an identifier from the payment instrument 414, as illustrated at operation 606, from an interaction between the payment instrument 414 and the reader device 412. The reader device 412 can send the identifier to the computing resource, as illustrated at operation 608.

As described above, in some examples, the identifier can comprise a static identifier, a private key, a U2F identity credential, etc. In at least one example where the identifier is a static identifier, the identifier can be designated by a user associated with the payment instrument 414. For example, the identifier can be a user-designated alphanumeric identifier that is associated with the payment instrument 414 and/or an account of the user, that in some examples, can be managed by a service provider as described herein. In such examples, the user-designated alphanumeric identifier, or an indication thereof, can be read by the reader device 412 responsive to an interaction between the payment instrument 414 and the reader device 412. In some examples, the identifier may not be designated by the user and, instead, may be payment data that is associated with the payment instrument 414. In such examples, the reader device 412 can read the payment data from the payment instrument 414 based on an interaction between the reader device 412 and the payment instrument 414.

In an additional or alternative example, the identifier can be a private key, that can be paired with a public key, for encrypting (and decrypting) data. In at least one example, when the payment instrument 414 interacts with the reader device 412, the payment instrument 414 can transmit data that is signed by the private key to the reader device 412. In some examples, the reader device 412 can transmit the unsigned data to the payment instrument 414 during the interaction, at which time the payment instrument 414 can sign the data and return the signed data to the reader device 412.

In some examples, the identifier can be a U2F identity credential derived by a U2F applet. That is, in at least one example, the identifier can be a private key that is compliant with FIDO Alliance specifications for U2F. In such an example, when the payment instrument 414 interacts with the reader device 412, the payment instrument 414 can transmit the U2F identity credential, or an indication associated therewith, to the reader device 412.

In at least one example, the computing resource(s) 410 can send an instruction to the reader device 412 to instruct the reader device 412 to read the identifier instead of payment data associated with the payment instrument 414. That is, the computing resource(s) 410 can instruct the reader device 412 to execute an application selection process to instruct the payment instrument 414 which applet the reader device 412 intends to read. As described above, responsive to receiving such an instruction, the reader device 412 can perform an application selection process to indicate to the payment instrument 414 which of the applet(s) 416 it desires to read information from. That is, as described above, the payment instrument 414 can have multiple applet(s) 416 runnable thereon and the reader device 412 can send a command to the payment instrument 414 that indicates an application identifier (AID) associated with the desired applet. Responsive to the reader device 412 sending the command (and the payment instrument 414 receiving the command), the payment instrument 414 can select the appropriate applet and provide a response to the reader device 412 so that the reader device 412 can read data from the correct applet. Additional details associated with application selection are described in ISO/IEC 7816.

At operation 610, the computing resource can determine whether the identifier corresponds to the user. In at least one example, the computing resource can access information associated with a profile of the user, which can be associated with the identifier. In some examples, the computing resource can receive such information from a service provider. In other examples, the computing resource can store such information locally. In at least one example, the computing resource can compare the identifier with the profile of the user to determine whether the identifier is in fact associated with the user (e.g., the profile associated therewith). In some examples, if the indicator and/or indication thereof is encrypted, the computing resource can decrypt the indicator and/or indication thereof prior to comparing the identifier with the profile of the user. In at least one example, if the identifier corresponds to the user, the computing resource can verify the identity of the user, as illustrated at operation 612, and can grant the user access to the computing resource, as illustrated at operation 614. However, if the identifier does not correspond to the identity of the user, the computing resource can determine that the identity of the user is not verified, as illustrated at operation 616, and can deny the user access to the computing resource, as illustrated at operation 618, at least because the computing resource is not able to verify the identity of the user. In some examples, the computing resource can prompt the user to submit a different authentication factor or to retry the payment instrument 414. In some examples, if the computing resource is not able to verify the identity of the user, the user may be able to access one or more functionalities and/or processes associated with the computing resource but not others. That is, in an example, a user may be able to access a landing page of an application (e.g., to initiate authentication) but, without authentication, may not be able to access and other functionality of the application.

Thus, as illustrated above, the computing resource is the verification challenger, issuing a challenge for the user to cause an interaction between a payment instrument 414 and the reader device 412. The reader device 412 can be the verification responder, providing a response to the challenge: an identifier from a payment instrument 414. Upon receiving a response from the verification responder, the computing resource can verify the identity of the user. As such, in FIG. 6, the computing resource can be referred to as the "verifying entity."

FIG. 7 illustrates another example process 700 for verifying an identity of a user using a payment instrument 414, wherein a computing resource is a verification challenger and a reader device is a verification responder, and wherein the reader device determines an identifier based at least in part on an interaction with a payment instrument 414.

In FIG. 7, operations 702 and 704 are the same operations as operations 602 and 604, described above in FIG. 6.

At operation 706, the reader device 412 can determine an identifier based at least in part on information received from the payment instrument 414. In at least one example, the reader device 412 can read information from a payment instrument 414 (e.g., via a standard payment protocol) and the reader device 412 can determine an identifier based at least in part on the information received from the payment instrument 414. In such an example, the payment instrument 414 may not store the identifier and instead, the reader device 412 can determine an interaction with the payment instrument 414 and determine an identifier based thereon. For example, based at least in part on reading payment data from the payment instrument 414, the reader device 412 (e.g., a functional component associated therewith) can determine an identifier based at least in part on the payment data. As a non-limiting example, a non-NFC-enabled card can be used with a functional component associated with the reader device 412, which can translate between EMV and/or NFC (payment) protocol and the U2F (security key) protocol.

At operation 708, the reader device 412 can send the identifier to the computing resource and the computing resource can determine whether to grant the user access to the computing resource via operations 710-718. Operations 708-718 are described above with reference to operations 608-618 of FIG. 6.

Much like FIG. 6, in FIG. 7, the computing resource is the verification challenger, issuing a challenge for the user to cause an interaction between a payment instrument 414 and the reader device 412. The reader device 412 can be the verification responder, providing a response to the challenge. Unlike FIG. 6, however, in FIG. 7, the reader device 412 determines the identifier based at least in part on information received from a payment instrument 414. That is, the identifier may not be read from the payment instrument 414, but instead may be determined by the reader device 412. Upon receiving a response from the verification responder, the computing resource can verify the identity of the user. As such, in FIG. 7, the computing resource can be referred to as the "verifying entity."

FIG. 8 illustrates an example process 800 for verifying an identity of a user using a payment instrument 414, wherein a computing resource is a verification challenger and a reader device is a verification responder, and wherein the reader device is associated with an identifier.

In FIG. 8, operation 802 is the same operation as operation 602, described above with reference to FIG. 6.

At operation 804, the computing resource can prompt the user to provide an identifier. In some examples, the reader device 412 can store the identifier. That is, as described above with reference to FIGS. 2 and 3, in some examples, the service provider (e.g., server computing device(s) 404 associated therewith) can provide an identifier to the reader device 412 for storage thereon. In such an example, responsive to the user receiving a prompt to provide an identifier, the user can interact with the reader device 412 to cause the reader device 412 to access the identifier (e.g., from a secure storage component), as illustrated at operation 806, and send the identifier, or an indication thereof, to the computing resource, as illustrated at operation 808. For example, in an example where the reader device 412 stores the identifier, and the identifier is a static identifier, the reader device 412 can send the static identifier to the computing resource. In an example where the reader device 412 stores the identifier, and the identifier is a private key, the reader device 412 can sign data using the private key and send the signed data to the computing resource. Furthermore, in an example where the reader device 412 stores the identifier, and the identifier is a U2F identity credential, the reader device 412 can transmit the U2F credential to the computing resource. In some examples, the reader device 412 can be associated with an actuation mechanism, the actuation of which can cause the identifier, or the indication thereof, to be sent to the computing resource.

At operation 810, the computing resource can determine whether the identifier corresponds to the user and can determine whether to grant the user access to the computing resource via operations 812-818. Operations 810-818 are described above with reference to operations 608-618 of FIG. 6.

Much like FIG. 6, as described above with respect to FIG. 8, the computing resource is the verification challenger, issuing a challenge for the user to provide an identifier. The reader device 412 can be the verification responder, providing a response to the challenge. Unlike FIG. 6 (or FIG. 7), however, in FIG. 8, the reader device 412 provides the identifier (without requiring an interaction between the reader device 412 and a payment instrument 414). That is, the identifier is not read from the payment instrument 414, but instead is stored by the reader device 412. Upon receiving a response from the verification responder, the computing resource can verify the identity of the user. As such, in FIG. 8, the computing resource can be referred to as the "verifying entity."

Figure 10:
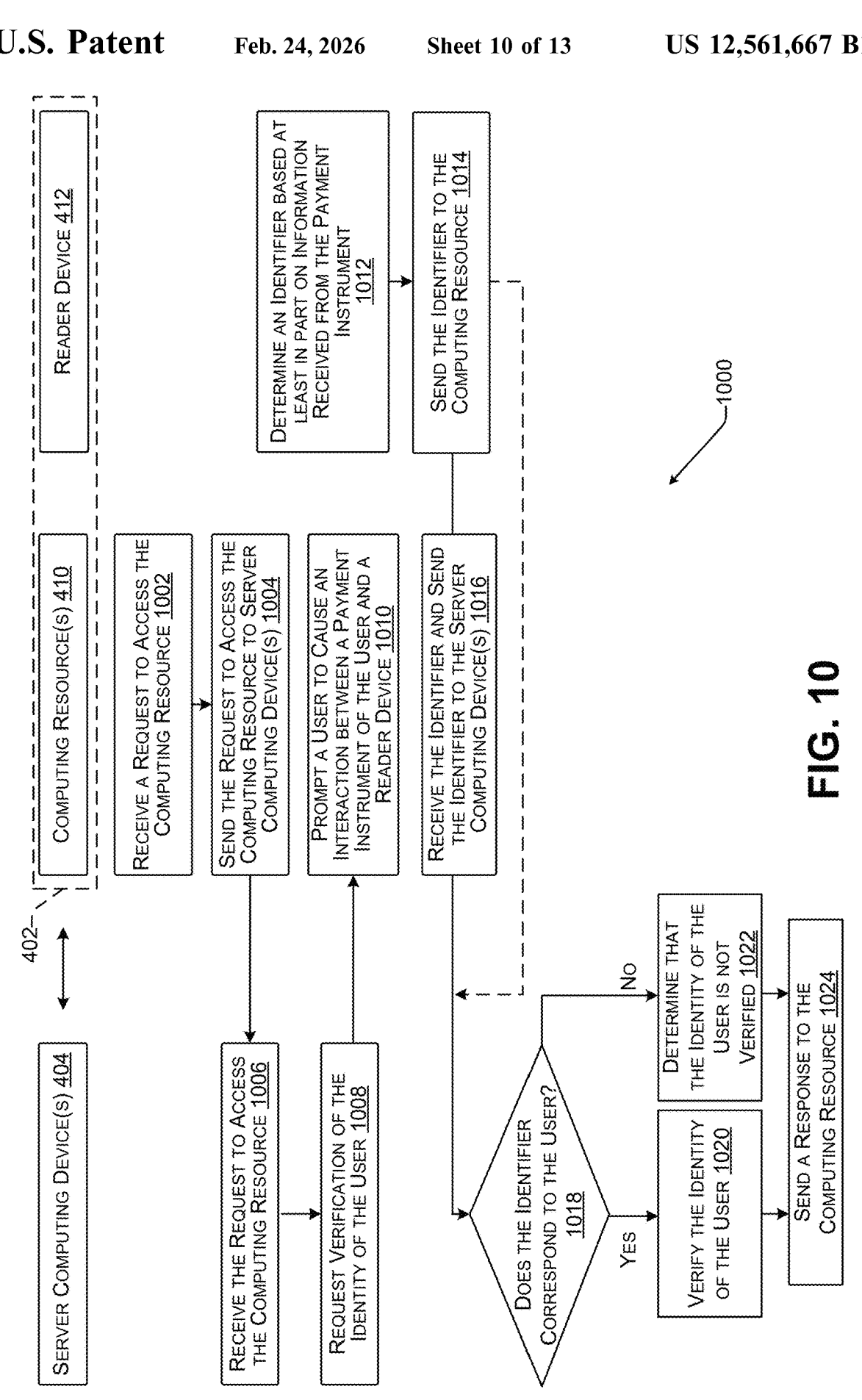
FIG. 10 illustrates another example process for verifying an identity of a user using a payment instrument, wherein server computing device(s) are a verification challenger and at least one of a computing resource and/or a reader device is a verification responder, and wherein the reader device determines an identifier based at least in part on an interaction with a payment instrument.
Figure 11:
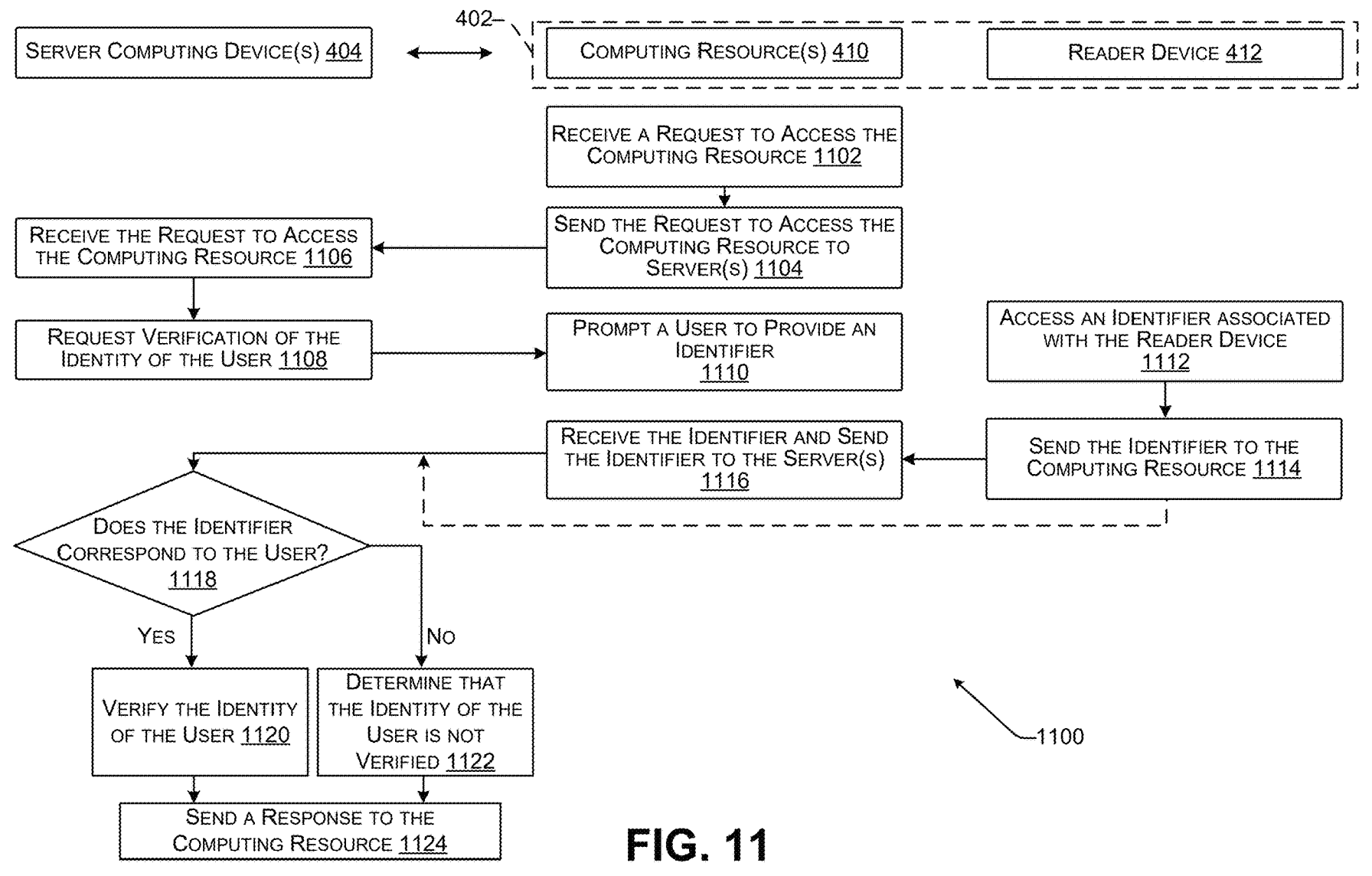

With respect to FIGS. 9-11, operations illustrated under the server computing device(s) 404 can be performed by the server computing device(s) 404, operations illustrated under the computing resource(s) 410 can be performed by such computing resource(s) 410, and operations illustrated under the reader device 412 can be performed by the reader device 412. In an example, the computing resource(s) 410 and the reader device 412 can be associated with user computing device 402. As described above, in some examples, the reader device 412 can be integrated with the user computing device 106 or can be coupled to the user computing device 106 via a wired or wireless connection.

FIG. 9 illustrates an example process 900 for verifying an identity of a user using a payment instrument 414, wherein server computing device(s) are a verification challenger and at least one of a computing resource and/or a reader device is a verification responder, and wherein the reader device obtains an identifier via an interaction with a payment instrument 414.

In FIG. 9, operation 902 is the same operation as operation 602, described above with reference to FIG. 6.

At operation 904, the computing resource sends the request to access the computing resource to the server computing device(s) 404.

At operation 906, the server computing device(s) 404 can receive the request to access the computing resource and can request verification of the identity of the user, as illustrated at operation 908. In an example, when the server computing device(s) 404 are the verification challenger, the server computing device(s) 404 can issue the verification challenge for the user computing device 402 and/or the reader device 412 to return an identifier associated with the user. In at least one example, the verification request can be sent to the computing resource and the computing resource can prompt a user to cause an interaction between a payment instrument 414 of the user and a reader device, as illustrated at operation 910.

As described above, in at least one example, the computing resource(s) 410 can send an instruction to the reader device 412 to instruct the reader device 412 to read the identifier instead of payment data associated with the payment instrument 414. That is, the computing resource(s) 410 can instruct the reader device 412 to execute an application selection process to instruct the payment instrument 414 which applet the reader device 412 intends to read. In some examples, such an instruction can be sent from the server computing device(s) 404 (e.g., in association with the request for verification of the identity of the user).

As described above, responsive to receiving such an instruction, the reader device 412 can perform an application selection process to indicate to the payment instrument 414 which of the applet(s) 416 it desires to read information from. That is, as described above, the payment instrument 414 can have multiple applet(s) 416 runnable thereon and the reader device 412 can send a command to the payment instrument 414 that indicates an application identifier (AID)

associated with the desired applet. Responsive to the reader device 412 sending the command (and the payment instrument 414 receiving the command), the payment instrument 414 can select the appropriate applet and provide a response to the reader device 412 so that the reader device 412 can read data from the correct applet. Additional details associated with application selection are described in ISO/IEC 7816.

In at least one example, responsive to the prompt, the user can cause an interaction between a payment instrument 414 and the reader device 412. For example, the user can dip the payment instrument 414 into the reader device 412, tap the payment instrument 414 on the reader device 412, or swipe the payment instrument 414 through the reader device 412. The reader device 412 can read information associated with the payment instrument 414, which in some examples, can be stored in a secured storage component (e.g., a microchip) associated with the payment instrument 414. As described above, the information can include an identifier that has been provided by a service provider, as described above with reference to FIGS. 2 and 3. As such, the reader device 412 can receive an identifier from the payment instrument 414, as illustrated at operation 912, from an interaction between the payment instrument 414 and the reader device 412. The reader device 412 can send the identifier to the computing resource, as illustrated at operation 914. In some examples, the reader device 412 can encrypt the identifier and/or other information read from the payment instrument 414s. As such, in some examples, the reader device 412 can send an indication of the identifier to the computing resource.

As described above, in at least one example, the identifier can comprise a static identifier, a private key, a U2F identity credential, etc. In at least one example where the identifier is a static identifier, the identifier can be designated by a user associated with the payment instrument 414. For example, the identifier can be a user-designated alphanumeric identifier that is associated with the payment instrument 414 and/or an account of the user, that in some examples, can be managed by a service provider as described herein. In such examples, the user-designated alphanumeric identifier, or an indication thereof, can be read by the reader device 412 responsive to an interaction between the payment instrument 414 and the reader device 412. In some examples, the identifier may not be designated by the user and, instead, may be payment data that is associated with the payment instrument 414. In such examples, the reader device 412 can read the payment data from the payment instrument 414 based on an interaction between the reader device 412 and the payment instrument 414.

In an additional or alternative example, the identifier can be a private key, that can be paired with a public key, for encrypting (and decrypting) data. In at least one example, when the payment instrument 414 interacts with the reader device 412, the payment instrument 414 can transmit data that is signed by the private key to the reader device 412. In some examples, the reader device 412 can transmit the unsigned data to the payment instrument 414 during the interaction, at which time the payment instrument 414 can sign the data and return the signed data to the reader device 412.

In some examples, the identifier can be a U2F identity credential, which can be derived by a U2F applet. That is, in at least one example, the identifier can be a private key that is compliant with FIDO Alliance specifications for U2F. In such an example, when the payment instrument 414 interacts with the reader device 412, the payment instrument 414 can transmit the U2F identity credential, or an indication associated therewith, to the reader device 412.

At operation 916, the computing resource can receive the identifier and send the identifier to the server computing device(s) 404. Note, in some examples, the reader device 412 can send the identifier, or an indication thereof, directly to the server computing device(s) 404 without sending it first to the computing resource, as shown by the dashed line in FIG. 9.

At operation 918, the server computing device(s) 404 can determine whether the identifier corresponds to the user. In at least one example, the server computing device(s) 404 (e.g., the verification module 420) can access information associated with a profile of the user (e.g., from the datastore 422), which can be associated with the identifier. In at least one example, the server computing device(s) 404 can compare the identifier with the profile of the user to determine whether the identifier is in fact associated with the user (e.g., the profile associated therewith). In some examples, if the indicator and/or indication thereof is encrypted, the server computing device(s) 404 can decrypt the indicator and/or indication thereof prior to comparing the identifier with the profile. In at least one example, if the identifier corresponds to the user, the server computing device(s) 404 can verify the identity of the user, as illustrated at operation 920. However, if the identifier does not correspond to the user, the server computing device(s) 404 can determine that the identity of the user is not verified, as illustrated at operation 922.

At operation 924, the server computing device(s) 404 can send a response to the computing resource. In some examples, the response can include an indication of whether the identity of the user is verified or not (e.g., as illustrated at operations 920 and 922). In some examples, the computing resource can receive the response and determine whether to grant the user access to the computing resource. In other examples, the server computing device(s) 404 can determine whether to grant the user access to the computing resource, based at least in part on whether the identity of the user is verified or not, and can include an indication of such in the response sent to the computing resource.

Thus, as described above, the server computing device(s) 404 comprise the verification challenger, issuing a challenge for the user to cause an interaction between a payment instrument 414 and the reader device 412. The computing resource(s) 410 and/or the reader device 412 can be the verification responder, providing a response to the challenge: an identifier from a payment instrument 414. Upon receiving a response from the verification responder, the server computing device(s) 404 can verify the identity of the user. As such, in FIG. 9, the server computing device(s) 404 can be referred to as the "verifying entity."

FIG. 10 illustrates another example process 1000 for verifying an identity of a user using a payment instrument 414, wherein server computing device(s) are a verification challenger and at least one of a computing resource and/or a reader device is a verification responder, and wherein the reader device determines an identifier based at least in part on an interaction with a payment instrument 414.

Operations 1002-1010 are described above with reference to operations 902-910 of FIG. 9.

Operation 1012 is described above with reference to operation 706 of FIG. 7. That is, in at least one example, the payment instrument 414 may not store the identifier and instead, the reader device 412 can determine an interaction with the payment instrument 414 and determine an identifier based thereon. For example, based at least in part on reading payment data from the payment instrument 414, the reader device 412 (e.g., a functional component associated therewith) can determine an identifier based at least in part on the payment data. As a non-limiting example, a non-NFC-enabled card can be used with a functional component associated with the reader device 412, which can translate between EMV and/or NFC (payment) protocol and the U2F (security key) protocol.

Operations 1014-1024 are described above with reference to operations 914-924 of FIG. 9.

Thus, much like FIG. 9 described above, in FIG. 10, the server computing device(s) 404 are the verification challenger, issuing a challenge for the user to cause an interaction between a payment instrument 414 and the reader device 412. The computing resource(s) 410 and/or the reader device 412 can be the verification responder, providing a response to the challenge. Unlike FIG. 9, however, in FIG. 10, the reader device 412 determines the identifier based at least in part on information received from a payment instrument 414. That is, the identifier may not be read from the payment instrument 414, but instead may be determined by the reader device 412. Upon receiving a response from the verification responder, the server computing device(s) 404 can verify the identity of the user. As such, in FIG. 10, the server computing device(s) 404 can be referred to as the "verifying entity."

FIG. 11 illustrates an example process 1100 for verifying an identity of a user using a payment instrument 414, wherein server computing device(s) are a verification challenger and at least one of a computing resource or a reader device is a verification responder, and wherein the reader device is associated with an identifier.

Operations 1102-1108 are described above with reference to operations 902-908 of FIG. 9.

Operations 1110 and 1112 are described above with reference to operations 804 and 806 of FIG. 8. In at least one example, the computing resource can prompt the user to provide an identifier. In some examples, the reader device 412 can store the identifier. That is, as described above with reference to FIGS. 2 and 3, in some examples, the service provider (e.g., server computing device(s) 404 associated therewith) can provide an identifier to the reader device 412 for storage thereon. In such an example, responsive to the user receiving a prompt to provide an identifier, the user can interact with the reader device 412 to cause the reader device 412 to access the identifier (e.g., from a secure storage component), as illustrated at operation 1112. In such an example, responsive to the user receiving a prompt to provide an identifier, the user can interact with the reader device 412 to cause the reader device 412 to access the identifier (e.g., from a secure storage component), as illustrated at operation 806, and send the identifier, or an indication thereof, to the computing resource, as illustrated at operation 808. For example, in an example where the reader device 412 stores the identifier, and the identifier is a static identifier, the reader device 412 can send the static identifier to the computing resource. In an example where the reader device 412 stores the identifier, and the identifier is a private key, the reader device 412 can sign data using the private key and send the signed data to the computing resource. Furthermore, in an example where the reader device 412 stores the identifier, and the identifier is a U2F identity credential, the reader device 412 can transmit the U2F credential to the computing resource. In some examples, the reader device 412 can be associated with an actuation mechanism, the actuation of which can cause the identifier, or the indication thereof, to be sent to the computing resource.

Operations 1114-1124 are described above with reference to operations 914-924 of FIG. 9.

Thus, much like FIG. 9 described above, in FIG. 11, the server computing device(s) 404 are the verification challenger, issuing a challenge for the user to provide an identifier. The computing resource(s) 410 and/or the reader device 412 can be the verification responder, providing a response to the challenge. Unlike FIG. 9 (or FIG. 10), however, in FIG. 11, the reader device 412 provides the identifier (without requiring an interaction between the reader device 412 and a payment instrument 414). That is, the identifier may not be read from the payment instrument 414, but instead may be stored by the reader device 412. Upon receiving a response from the verification responder, the server computing device(s) 404 can verify the identity of the user. As such, in FIG. 11, the server computing device(s) 404 can be referred to as the "verifying entity."

While FIGS. 9-11 illustrate and describe the server computing device(s) 404 as the verifying entity, in additional or alternative examples, the third-party server computing device(s) 406 can perform the same or similar operations. In such examples, the user can be requesting to access a computing resource associated with a third-party service provider instead of a computing resource associated with the service provider.

Furthermore, while FIGS. 9-11 illustrate example processes whereby a request to access a computing resource is received via the computing resource(s) 410 and the computing resource(s) 410 send the request to the server computing device(s) 404, in some examples, the request can be originated by other computing resource(s) and the request can be received from such other computing resource(s) and/or third-party server computing device(s) 406. That is, the processes 900-1100 may not start at operations 902-904, 1002-1004, and/or 1102-1104 and instead, in some examples, may start at operations 906, 1006, and/or 1106, respectively.

Figure 12:
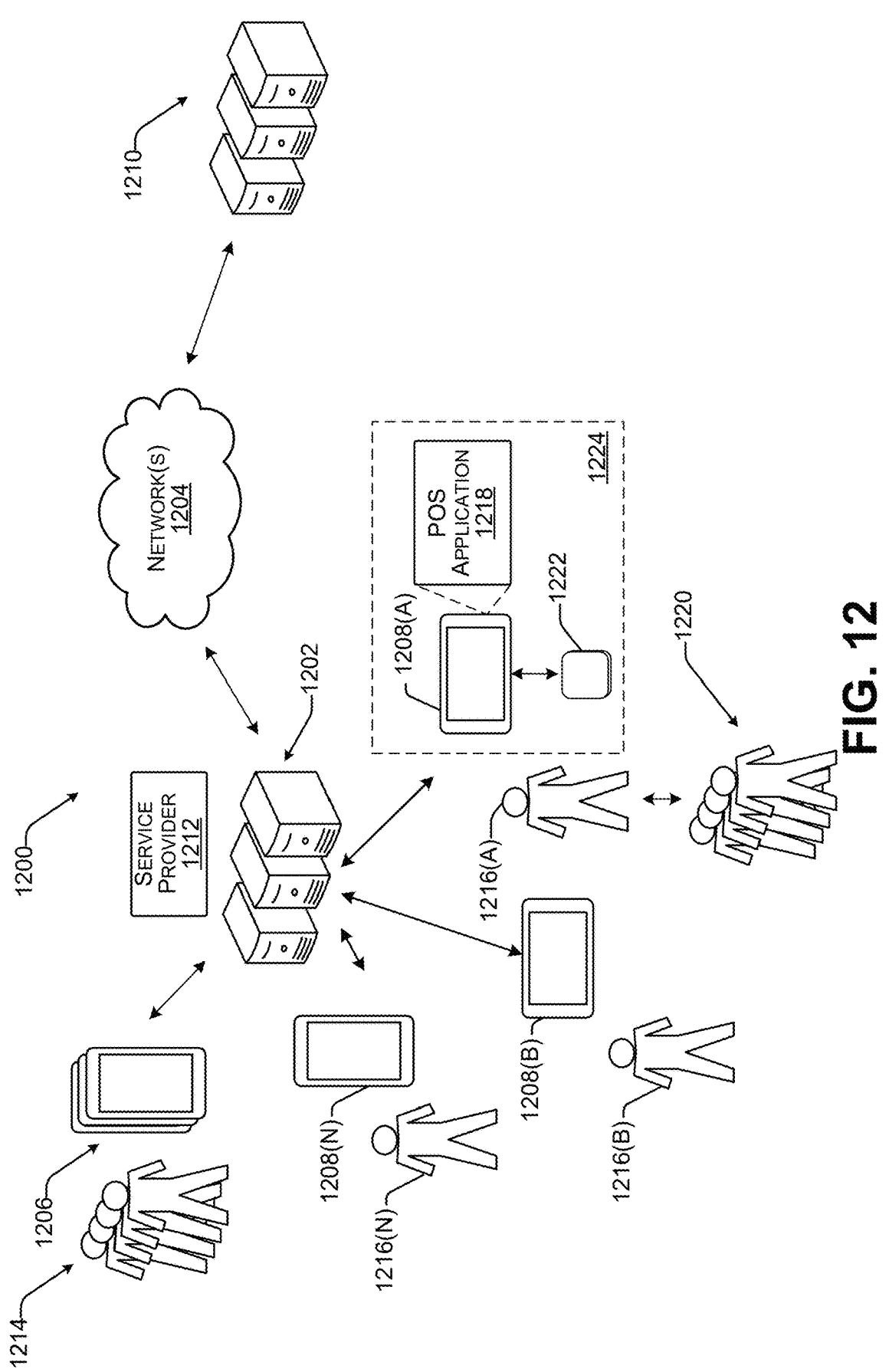
FIG. 12 illustrates an example environment for facilitating, among other things, techniques described herein.

FIG. 12 illustrates an example environment 1200. The environment 1200 includes server computing device(s) 1202 that can communicate over a network 1204 with user devices 1206 (which, in some examples can be seller devices 1208 (individually, 1208(A)-1208(N))) and/or server computing device(s) 1210 associated with third-party service provider(s). The server computing device(s) 1202 can be associated with a service provider 1212 that can provide one or more services for the benefit of users 1214, as described below. Actions attributed to the service provider 1212 can be performed by the server computing device(s) 1202.

In at least one example, the server computing device(s) 1202 can correspond to the server computing device(s) 404 described above with reference to FIG. 4. In at least one example, the network(s) 1204 can correspond to the network(s) 408 described above with reference to FIG. 4. Furthermore, in at least one example, the user devices 1206 can correspond to the user computing device 402 described above with reference to FIG. 4. In at least one example, the third-party server computing device(s) 1210 can correspond to the server computing device(s) 406 described above with reference to FIG. 4.

In at least one example, the environment 1200 can facilitate identity verification using payment instrument(s), as described herein. In an example, an identifier corresponding to a user can be associated with a microchip embedded in a payment instrument, such as a credit card or debit card, or otherwise associated with a secure storage of a payment instrument. The identifier can be a user-designated identifier, a private key, a U2F identity credential, or the like. A verifying entity-which can be a computing resource (e.g., an application, a web page, etc.) and/or server computing device(s) 1202 associated with a service provider 1212 (or third-party server computing device(s) 1210)—can receive a request to access the computing resource availed via a computing device operable by the user, such as one of the user computing devices 1206. The verifying entity can determine whether to grant the user access to the computing resource based on receiving the identifier and/or an indication of the identifier via an interaction between the payment instrument and a reader device associated with the computing resource. For example, the verifying entity can receive the identifier and/or an indication of the identifier via an interaction between the payment instrument and the reader device and, if the identifier corresponds to the user (e.g., the identifier is associated with a profile storing identification information of the user), the verifying entity can verify the identity of the user and grant the user access to the computing resource.

The environment 1200 can therefore enable payment instruments—such as credit cards and/or debit cards—to be used as security keys. That is, in multi-factor authentication, users can present payment instruments-which securely store information that is personal to the users (e.g., user-designated identifiers, private keys, U2F identity credentials, etc.)—as a factor for authentication. As such, techniques described herein enable users to protect themselves against thieves and/or malicious actors seeking to steal or improperly obtain information associated with such users. By enabling users to use payment instruments—which are regularly carried around by users—instead of conventional U2F hardware tokens, techniques described herein offer improvements to existing verification technology.

The environment 1200 can include a plurality of user devices 1206, as described above. Each one of the plurality of user devices 1206 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1214. The users 1214 can be referred to as customers, buyers, merchants, sellers, borrowers, employees, employers, payors, payees, couriers and so on. The users 1214 can interact with the user devices 1206 via user interfaces presented via the user devices 1206. In at least one example, a user interface can be presented via a web browser, or the like. In other examples, a user interface can be presented via an application, such as a mobile application or desktop application, which can be provided by the service provider 1212 or which can be an otherwise dedicated application. In some examples, individual of the user devices 1206 can have an instance or versioned instance of an application, which can be downloaded from an application store, for example, which can present the user interface(s) described herein. In at least one example, a user 1214 can interact with the user interface via touch input, spoken input, or any other type of input.

As described above, in at least one example, the users 1214 can include sellers 1216 (individually, 1216(A)-1216 (N)). In an example, the sellers 1216 can operate respective seller devices 1208, which can be user devices 1206 configured for use by sellers 1216. For the purpose of this discussion, a "seller" can be any entity that offers items (e.g., goods or services) for purchase or other means of acquisition (e.g., rent, borrow, barter, etc.). The sellers 1216 can offer items for purchase or other means of acquisition via brick-and-mortar stores, mobile stores (e.g., pop-up shops, food trucks, etc.), online stores, combinations of the foregoing, and so forth. In some examples, at least some of the sellers 1216 can be associated with a same entity but can have different seller locations and/or can have franchise/franchisee relationships. In additional or alternative examples, the sellers 1216 can be different sellers. That is, in at least one example, the seller 1216(A) is a different seller than the seller 1216(B) and/or the seller 1216(C).

For the purpose of this discussion, "different sellers" can refer to two or more unrelated sellers. "Different sellers" therefore can refer to two or more sellers that are different legal entities (e.g., natural persons and/or corporate persons) that do not share accounting, employees, branding, etc. "Different sellers," as used herein, have different names, employer identification numbers (EIN)s, lines of business (in some examples), inventories (or at least portions thereof), and/or the like. Thus, the use of the term "different sellers" does not refer to a seller with various seller locations or franchise/franchisee relationships. Such sellers—with various seller locations or franchise/franchisee relationships—can be referred to as sellers having different seller locations and/or different commerce channels.

Each seller device 1208 can have an instance of a POS application 1218 stored thereon. The POS application 1218 can configure the seller device 1208 as a POS terminal, which enables the seller 1216(A) to interact with one or more buyers 1220. As described above, the users 1214 can include buyers, such as the buyers 1220 shown as interacting with the seller 1216(A). For the purpose of this discussion, a "buyer" can be any entity that acquires items from sellers. While only two buyers 1220 are illustrated in FIG. 12, any number of buyers 1220 can interact with the sellers 1216. Further, while FIG. 12 illustrates the buyers 1220 interacting with the seller 1216(A), the buyers 1220 can interact with any of the sellers 1216.

In at least one example, interactions between the buyers 1220 and the sellers 1216 that involve the exchange of funds (from the buyers 1220) for items (from the sellers 1216) can be referred to as "POS transactions" and/or "transactions." In at least one example, the POS application 1218 can determine transaction data associated with the POS transactions. Transaction data can include payment information, which can be obtained from a reader device 1222 associated with the seller device 1208(A), user authentication data, purchase amount information, point-of-purchase information (e.g., item(s) purchased, date of purchase, time of purchase, etc.), etc. The POS application 1218 can send transaction data to the server computing device(s) 1202. Furthermore, the POS application 1218 can present a UI to enable the seller 1216(A) to interact with the POS application 1218 and/or the service provider 1212 via the POS application 1218.

In at least one example, the seller device 1208(A) can be a special-purpose computing device configured as a POS terminal (via the execution of the POS application 1218). In at least one example, the POS terminal may be connected to a reader device 1222, which is capable of accepting a variety of payment instruments, such as credit cards, debit cards, gift cards, short-range communication-based payment instruments, and the like, as described below. In at least one example, the reader device 1222 can plug in to a port in the seller device 1208(A), such as a microphone port, a headphone port, an audio-jack, a data port, or other suitable port. In additional or alternative examples, the reader device 1222 can be coupled to the seller device 1208(A) via another wired or wireless connection, such as via a Bluetooth®, BLE, and so on. Additional details are described below with reference to FIG. 13. In some examples, the reader device 1222 can read information from alternative payment instruments including, but not limited to, wristbands and the like.

In some examples, the reader device 1222 may physically interact with payment instruments such as magnetic stripe payment cards, EMV payment cards, and/or short-range communication (e.g., NFC, RFID, Bluetooth®, BLE, etc.) payment instruments (e.g., cards or devices configured for tapping). The POS terminal may provide a rich user interface, communicate with the reader device 1222, and communicate with the server computing device(s) 1202, which can provide, among other services, a payment processing service. The server computing device(s) 1202 associated with the service provider 1212 can communicate with server computing device(s) 1210, as described below. In this manner, the POS terminal and reader device 1222 may collectively process transaction(s) between the sellers 1216 and buyers 1220. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1222 of the POS system 1224 are shown as separate devices, in additional or alternative examples, the POS terminal and the reader device 1222 can be part of a single device. In some examples, the reader device 1222 can have a display integrated therein for presenting information to the buyers 1220. In additional or alternative examples, the POS terminal can have a display integrated therein for presenting information to the buyers 1220. POS systems, such as the POS system 1224, may be mobile, such that POS terminals and reader devices may process transactions in disparate locations across the world. POS systems can be used for processing card-present transactions and card-not-present (CNP) transactions, as described below.

A card-present transaction is a transaction where both a buyer 1220 and his or her payment instrument are physically present at the time of the transaction. Card-present transactions may be processed by swipes, dips, taps, or any other interaction between a physical payment instrument (e.g., a card), or otherwise present payment instrument, and a reader device 1222 whereby the reader device 1222 is able to obtain payment data from the payment instrument. A swipe is a card-present transaction where a buyer 1220 slides a card, or other payment instrument, having a magnetic strip through a reader device 1222 that captures payment data contained in the magnetic strip. A dip is a card-present transaction where a buyer 1220 inserts a payment instrument having an embedded microchip (i.e., chip) into a reader device 1222 first. The dipped payment instrument remains in the reader device until the reader device 1222 prompts the buyer 1220 to remove the card, or other payment instrument. In some examples, while the payment instrument is in the reader device 1222, the microchip can create a code which can be sent from the POS system 1224 to the server computing device(s) 1210 (which can be associated with third-party service providers that provide payment services, including but not limited to, an acquirer bank, an issuer, and/or a card payment network (e.g., Mastercard®, VISA®, etc.)) to be matched with another code. In some examples, as described above, such a "code" can be a signature associated with public-key cryptography and/or symmetric cryptography. A tap is a card-present transaction where a buyer 1220 may tap or hover his or her payment instrument (e.g., card, electronic device such as a smart phone running a payment application, etc.) over a reader device 1222 to complete a transaction via short-range communication (e.g., NFC, RFID, Bluetooth®, BLE, etc.). Short-range communication enables the payment instrument to exchange information with the reader device 1222. A tap may also be called a contactless payment.

A CNP transaction is a transaction where a card, or other payment instrument, is not physically present at the POS such that payment data is required to be manually keyed in (e.g., by a seller, buyer, etc.), or payment data is required to be recalled from a card-on-file data store, to complete the transaction.

The POS system 1224, the server computing device(s) 1202, and/or the server computing device(s) 1210 may exchange payment information and transaction data to determine whether transactions are authorized. For example, the POS system 1224 may provide encrypted payment data, user authentication data, purchase amount information, point-of-purchase information, etc. (collectively, transaction data) to server computing device(s) 1202 over the network(s) 1204. The server computing device(s) 1202 may send the transaction data to the server computing device(s) 1210. As described above, in at least one example, the server computing device(s) 1210 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of sellers(s). An acquirer can be a registered member of a card association (e.g., Visa®, MasterCard®), and can be part of a card payment network. The acquirer (e.g., the server computing device(s) 1210 associated therewith) can send a fund transfer request to a server computing device of a card payment network (e.g., Mastercard®, VISA®, etc.) to determine whether the transaction is authorized or deficient. In at least one example, the service provider 1212 can serve as an acquirer and connect directly with the card payment network.

The card payment network (e.g., the server computing device(s) 1210 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1210 associated therewith) can make a determination as to whether the buyer has the capacity to absorb the relevant charge associated with the payment transaction. In at least one example, the service provider 1212 can serve as an issuer and/or can partner with an issuer. The transaction is either approved or rejected by the issuer and/or the card payment network (e.g., the server computing device(s) 1210 associated therewith), and a payment authorization message is communicated from the issuer to the POS device via a path opposite of that described above, or via an alternate path.

As described above, the server computing device(s) 1210, which can be associated with payment service provider(s), may determine whether the transaction is authorized based on the transaction data, as well as information relating to parties to the transaction (e.g., the buyer 1220 and/or the seller 1216(A)). The server computing device(s) 1210 may send an authorization notification over the network(s) 1204 to the server computing device(s) 1202, which may send the authorization notification to the POS system 1224 over the network(s) 1204 to indicate whether the transaction is authorized. The server computing device(s) 1202 may also transmit additional information such as transaction identifiers to the POS system 1224. In one example, the server computing device(s) 1202 may include a seller application and/or other functional components for communicating with the POS system 1224 and/or the server computing device(s) 1210 to authorize or decline transactions.

Based on the authentication notification that is received by the POS system 1224 from server computing device(s) 1202, the seller 1216(A) may indicate to the buyer 1220 whether the transaction has been approved. In some examples, approval may be indicated at the POS system 1224, for example, at a display of the POS system 1224. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1212 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1214 can access all of the services of the service provider 1212. In other examples, the users 1214 can have gradated access to the services, which can be based on risk tolerance, IDV outputs, subscriptions, and so on. In at least one example, access to such services can be availed to the sellers 1216 via the POS application 1218. In additional or alternative examples, each service can be associated with its own access point (e.g., application, web browser, etc.).

The service provider 1212 can offer payment processing services for processing payments on behalf of the sellers 1216, as described above. For example, the service provider 1212 can provision payment processing software, payment processing hardware and/or payment processing services to sellers 1216, as described above, to enable the sellers 1216 to receive payments from the buyers 1220 when conducting POS transactions with the buyers 1220. For instance, the service provider 1212 can enable the sellers 1216 to receive cash payments, payment card payments, and/or electronic payments from buyers 1220 for POS transactions and the service provider 1212 can process transactions on behalf of the sellers 1216.

As the service provider 1212 processes transactions on behalf of the sellers 1216, the service provider 1212 can maintain accounts or balances for the sellers 1216 in one or more ledgers. For example, the service provider 1212 can analyze transaction data received for a transaction to determine an amount of funds owed to a seller 1216(A) for the transaction. In at least one example, such an amount can be a total purchase price less fees charged by the service provider 1212 for providing the payment processing services. Based on determining the amount of funds owed to the seller 1216(A), the service provider 1212 can deposit funds into an account of the seller 1216(A). The account can have a stored balance, which can be managed by the service provider 1212. The account can be different from a conventional bank account at least because the stored balance is managed by a ledger of the service provider 1212 and the associated funds are accessible via various withdrawal channels including, but not limited to, scheduled deposit, same-day deposit, instant deposit, and a linked payment instrument.

A scheduled deposit can occur when the service provider 1212 transfers funds associated with a stored balance of the seller 1216(A) to a bank account of the seller 1216(A) that is held at a bank or other financial institution (e.g., associated with the server computing device(s) 1210). Scheduled deposits can occur at a prearranged time after a POS transaction is funded, which can be a business day after the POS transaction occurred, or sooner or later. In some examples, the seller 1216(A) can access funds prior to a scheduled deposit. For instance, the seller 1216(A) may have access to same-day deposits (e.g., wherein the service provider 1212 deposits funds from the stored balance to a linked bank account of the seller on a same day as POS transaction, in some examples prior to the POS transaction being funded) or instant deposits (e.g., wherein the service provider 1212 deposits funds from the stored balance to a linked bank account of the seller on demand, such as responsive to a request). Further, in at least one example, the seller 1216(A) can have a payment instrument that is linked to the stored balance that enables the seller to access the funds without first transferring the funds from the account managed by the service provider 1212 to the bank account of the seller 1216(A).

In at least one example, the service provider 1212 may provide inventory management services. That is, the service provider 1212 may provide inventory tracking and reporting. Inventory management services may enable the seller 1216(A) to access and manage a database storing data associated with a quantity of each item that the seller 1216(A) has available (i.e., an inventory). Furthermore, in at least one example, the service provider 1212 can provide catalog management services to enable the seller 1216(A) to maintain a catalog, which can be a database storing data associated with items that the seller 1216(A) has available for acquisition (i.e., catalog management services). In at least one example, the catalog may include a plurality of data items and a data item of the plurality of data items may represent an item that the seller 1261(A) has available for acquisition. The service provider 1212 can offer recommendations related to pricing of the items, placement of items on the catalog, and multi-party fulfilment of the inventory.

In at least one example, the service provider 1212 can provide business banking services, which allow the seller 1216(A) to track deposits (from payment processing and/or other sources of funds) into an account of the seller 1216(A), payroll payments from the account (e.g., payments to employees of the seller 1216(A)), payments to other sellers (e.g., business-to-business) directly from the account or from a linked debit card, withdrawals made via scheduled deposit and/or instant deposit, etc. Furthermore, the business banking services can enable the seller 1216(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the sellers 1216 to visualize their cash flow to track their financial health, set aside money for upcoming obligations (e.g., savings), organize money around goals, etc.

In at least one example, the service provider 1212 can provide financing services and products, such as via business loans, consumer loans, fixed term loans, flexible term loans, and the like. In at least one example, the service provider 1212 can utilize one or more risk signals to determine whether to extend financing offers and/or terms associated with such financing offers.

In at least one example, the service provider 1212 can provide financing services for offering and/or lending a loan to a borrower that is to be used for, in some instances, financing the borrower's short-term operational needs (e.g., a capital loan). For instance, a potential borrower that is a seller can obtain a capital loan via a capital loan product in order to finance various operational costs (e.g., rent, payroll, inventory, etc.). In at least one example, the service provider 1212 can offer different types of capital loan products. For instance, in at least one example, the service provider 1212 can offer a daily repayment loan product, wherein a capital loan is repaid daily, for instance, from a portion of transactions processed by the payment processing service on behalf of the borrower. Additionally and/or alternatively, the service provider 1212 can offer a monthly repayment loan product, wherein a capital loan is repaid monthly, for instance, via a debit from a bank account linked to the payment processing service. The credit risk of the seller may be evaluated using risk models that take into account factors, such as payment volume, credit risk of similarly situated sellers, past transaction history, seasonality, credit history, and so on.

Additionally or alternatively, the service provider 1212 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a seller, which can be one of the sellers 1216. The service provider 1212 can generate the loan based at least in part on determining that the borrower purchased or intends to purchase the item from the seller. The loan can be associated with a balance based on an actual purchase price of the item and the borrower can repay the loan over time.

In some examples, the borrower can repay the loan via installments, which can be paid via funds managed and/or maintained by the service provider 1212 (e.g., from payments owed to the seller from payments processed on behalf of the seller, funds transferred to the seller, etc.). The service provider 1212 can offer specific financial products, such as payment instruments, tied specifically to the loan products. For example, in one implementation, the server provider 1212 associates capital to a seller or buyer's debit card, where the use of the debit card is defined by the terms of the loan. In some examples, the seller may only use the debit card for making specific purchases. In other examples, the "installment" associated with the loan product is credited directly via the payment instrument. The payment instrument is thus customized to the loan and/or the parties associated with the loan.

The service provider 1212 can provide web-development services, which enable users 1214 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the sellers 1216. In at least one example, the service provider 1212 can recommend and/or generate content items to supplement omni-channel presences of the sellers 1216. That is, if a seller of the sellers 1216 has a web page, the service provider 1212—via the web-development or other services—can recommend and/or generate additional content items to be presented via other channel(s), such as social media, email, etc.

Furthermore, the service provider 1212 can provide payroll services to enable employers to pay employees for work performed on behalf of employers. In at least one example, the service provider 1212 can receive data that includes time worked by an employee (e.g., through imported timecards and/or POS interactions), sales made by the employee, gratuities received by the employee, and so forth. Based on such data, the service provider 1212 can make payroll payments to employee(s) on behalf of an employer via the payroll service. For instance, the service provider 1212 can facilitate the transfer of a total amount to be paid out for the payroll of an employee from the bank of the employer to the bank of the service provider 1212 to be used to make payroll payments. In at least one example, when the funds have been received at the bank of the service provider 1212, the service provider 1212 can pay the employee, such as by check or direct deposit, often a day, a week, or more after when the work was actually performed by the employee. In additional or alternative examples, the service provider 1212 can enable employee(s) to receive payments via same-day or instant deposit based at least in part on risk and/or reliability analyses performed by the service provider 1212.

Moreover, in at least one example, the service provider 1212 can provide employee management services for managing schedules of employees. Further, the service provider 1212 can provide appointment services for enabling users 1214 to set schedules for scheduling appointments and/or users 1214 to schedule appointments.

In some examples, the service provider 1212 can provide restaurant management services to enable users 1214 to make and/or manage reservations, to monitor front-of-house and/or back-of-house operations, and so on. In such examples, the seller device(s) 1208 and/or server computing device(s) 1202 can be configured to communicate with one or more other computing devices, which can be located in the front-of-house (e.g., POS device(s)) and/or back-of-house (e.g., kitchen display system(s) (KDS)). In at least one example, the service provider 1212 can provide order management services and/or fulfillment services to enable restaurants to manage open tickets, split tickets, and so on and/or manage fulfillment services. In some examples, such services can be associated with restaurant sellers, as described above. In additional or alternative examples, such services can be any type of seller.

In at least one example, the service provider 1212 can provide fulfilment services, which can use couriers for delivery, wherein couriers can travel between multiple locations to provide delivery services, photography services, etc. Couriers can be users 1214 who can travel between locations to perform services for a requesting user 1214 (e.g., deliver items, capture images, etc.). In some examples, the courier can receive compensation from the service provider 1212. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1212 can receive requests for courier services, automatically assign the requests to active couriers, and communicate dispatch instructions to couriers via user interface (e.g., application, web browser, or other access point) presented via respective devices 1206.

In some examples, the service provider 1212 can provide omni-channel fulfillment services. For instance, if a buyer places an order with a seller and the seller cannot fulfill the order because one or more items are out of stock or otherwise unavailable, the service provider 1212 can leverage other sellers and/or sales channels that are part of the platform of the service provider 1212 to fulfill the buyer's order. That is, another seller can provide the one or more items to fulfill the order of the buyer. Furthermore, in some examples, another sales channel (e.g., online, brick-and-mortar, etc.) can be used to fulfill the order of the buyer.

In some examples, the service provider 1212 can enable conversational commerce via conversational commerce services, which can use one or more machine learning mechanisms to analyze messages exchanged between two or more users 1214, voice inputs into a virtual assistant or the like, to determine intents of user(s) 1214. In some examples, the service provider 1212 can utilize determined intents to automate buyer service, offer promotions, provide recommendations, or otherwise interact with buyers in real-time. In at least one example, the service provider 1212 can integrate products and services, and payment mechanisms into a communication platform (e.g., messaging, etc.) to enable buyers to make purchases, or otherwise transact, without having to call, email, or visit a web page or other channel of a seller. That is, conversational commerce alleviates the need for buyers to toggle back and forth between conversations and web pages to gather information and make purchases.

In at least one example, the service provider 1212 can provide a peer-to-peer payment service that enables peer-to-peer payments between two or more users 1214. In at least one example, the service provider 1212 can communicate with instances of a payment application (or other access point) installed on devices 1206 configured for operation by users 1214. In an example, an instance of the payment application executing on a first device operated by a payor can send a request to the service provider 1212 to transfer an amount of funds (e.g., fiat currency or non-fiat currency such as cryptocurrency, securities, and related assets) from an account of the payor to an account of a payee (e.g., a peer-to-peer payment). The service provider 1212 can facilitate the transfer and can send a notification to an instance of the payment application executing on a second mobile device operated by the payee that the transfer is in process (or has been completed). In some examples, the service provider 1212 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1212 funds the request to payee on behalf of the payor, to speed up the transfer process and compensate for any lags that may be attributed to payor's financial network.

In some implementations, the service provider 1212 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1206.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1212. For instance, the service provider 1212 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1206 (e.g., mobile device or conventional personal computer (PC)) based on instructions transmitted to and from the server computing device(s) 1202 (which, in such an example can be called a "messaging server"). In some instances, the messaging application can include a payment application with messaging capability that enables users of the payment application to communicate with one another. In such instances, the payment application can be executed on the user device 1206 based on instructions transmitted to and from the server computing device(s) 1202 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1212 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1214 may be new to the service provider 1212 such that the user 1214 that has not registered (e.g., subscribed to receive access to one or more services offered by the service provider) with the service provider 1212. The service provider 1212 can offer onboarding services for registering a potential user 1214 with the service provider 1212. In some examples, onboarding can involve presenting various questions, prompts, and the like to a potential user 1214 to obtain information that can be used to generate a profile for the potential user 1214. In at least one example, the service provider 1212 can provide limited or short-term access to its services prior to, or during, onboarding (e.g., a user of a peer-to-peer payment service can transfer and/or receive funds prior to being fully onboarded, a seller can process payments prior to being fully onboarded, etc.). In at least one example, responsive to the potential user 1214 providing all necessary information, the potential user 1214 can be onboarded to the service provider 1212. In such an example, any limited or short-term access to services of the service provider 1212 can be transitioned to more permissive (e.g., less limited) or longer-term access to such services.

The service provider 1212 can be associated with IDV services, which can be used by the service provider 1212 for compliance purposes and/or can be offered as a service, for instance to third-party service providers (e.g., associated with the server computing device(s) 1210). That is, the service provider 1212 can offer IDV services to verify the identity of users 1214 seeking to use or using their services. Identity verification requires a buyer (or potential buyer) to provide information that is used by compliance departments to prove that the information is associated with an identity of a real person or entity. In at least one example, the service provider 1212 can perform services for determining whether identifying information provided by a user 1214 accurately identifies the buyer (or potential buyer) (i.e., Is the buyer who they say they are?).

The service provider 1212 is capable of providing additional or alternative services and the services described above are offered as a sampling of services. In at least one example, the service provider 1212 can exchange data with the server computing device(s) 1210 associated with third-party service providers. Such third-party service providers can provide information that enables the service provider 1212 to provide services, such as those described above. In additional or alternative examples, such third-party service providers can access services of the service provider 1212. That is, in some examples, the third-party service providers can be subscribers, or otherwise access, services of the service provider 1212.

Techniques described herein can be configured to operate in both real-time/online and offline modes. "Online" modes refer to modes when devices are capable of communicating with the service provider 1212 (e.g., the server computing device(s) 1202) and/or the server computing device(s) 1210 via the network(s) 1204. In some examples, the seller device(s) 1208 are not capable of connecting with the service provider 1212 (e.g., the server computing device(s) 1202) and/or the server computing device(s) 1210, due to a network connectivity issue, for example. In additional or alternative examples, the server computing device(s) 1202 are not capable of communicating with the server computing device(s) 1210 due to network connectivity issue, for example. In such examples, devices may operate in "offline" mode where at least some payment data is stored (e.g., on the seller device(s) 1208) and/or the server computing device(s) 1202 until connectivity is restored and the payment data can be transmitted to the server computing device(s) 1202 and/or the server computing device(s) 1210 for processing.

In at least one example, the service provider 1212 can be associated with a hub, such as an order hub, an inventory hub, a fulfillment hub and so on, which can enable integration with one or more additional service providers (e.g., associated with the additional server computing device(s) 1210). In some examples, such additional service providers can offer additional or alternative services and the service provider 1212 can provide an interface or other computer-readable instructions to integrate functionality of the service provider 1212 into the one or more additional service providers.

Techniques described herein are directed to services provided via a distributed system of user devices 1206 that are in communication with one or more server computing devices 1202 of the service provider 1212. That is, techniques described herein are directed to a specific implementation—or, a practical application—of utilizing a distributed system of user devices 1206 that are in communication with one or more server computing devices 1202 of the service provider 1212 to perform a variety of services, as described above. The unconventional configuration of the distributed system described herein enables the server computing device(s) 1202 that are remotely-located from end-users (e.g., users 1214) to intelligently offer services based on aggregated data associated with the end-users, such as the users 1214 (e.g., data associated with multiple, different sellers and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct seller accounts, e.g., accounts within the control of the service provider 1212, and those outside of the control of the service provider 1212, to track the business standing (payables, receivables, payroll, invoices, appointments, capital, etc.) of the sellers. The techniques herein provide a consolidated view of a seller's cash flow, predict needs, preemptively offer recommendations or services, such as capital, coupons, etc., and/or enable money movement between disparate accounts (seller's, another seller's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1214 and user devices 1206. Furthermore, such features are changed dynamically based on the profiles of the users involved interacting with the GUIs. As such, techniques described herein are directed to improvements to computing systems.

Figure 13:
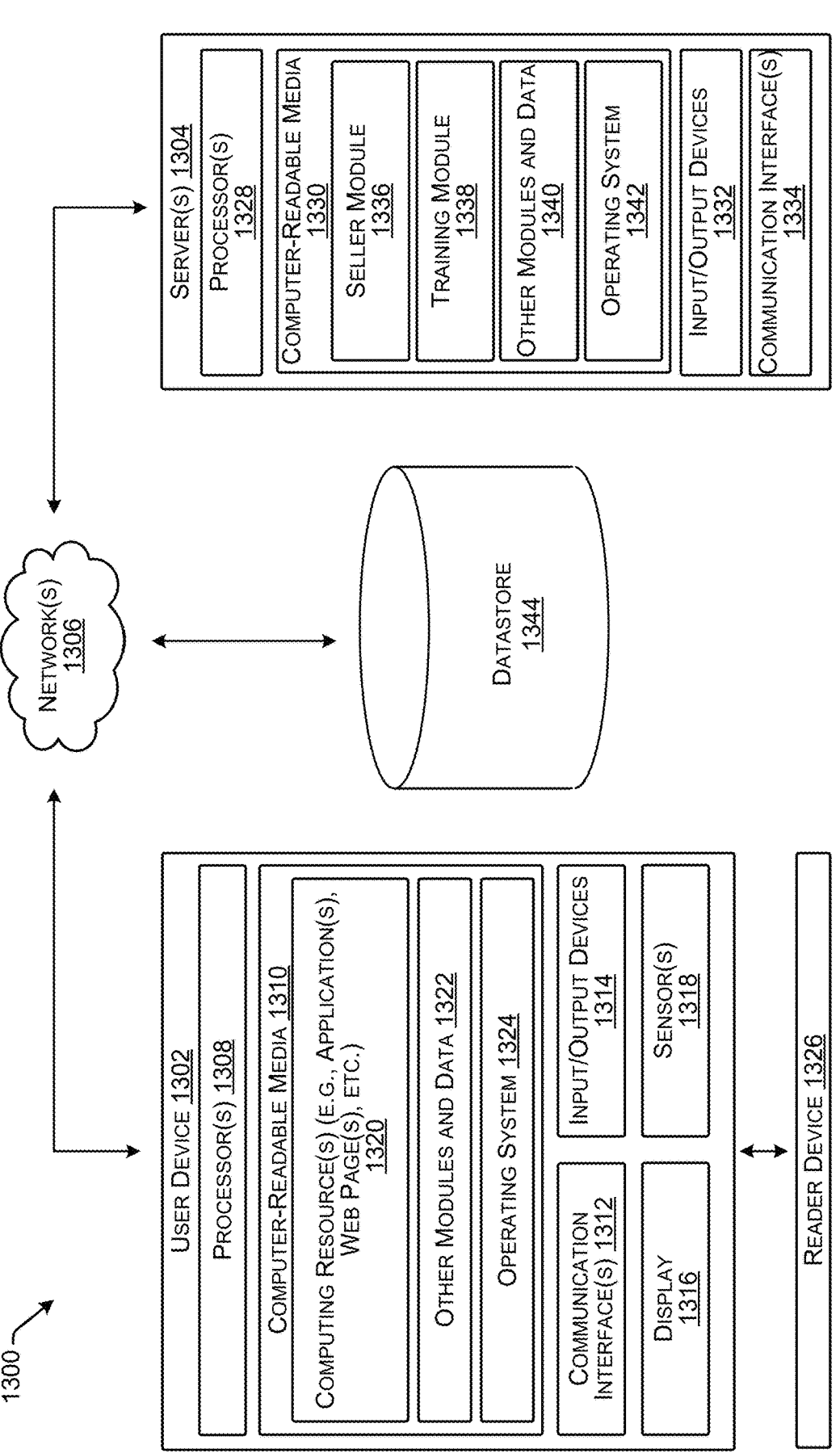
FIG. 13 illustrates additional details associated with individual components of the system described above in FIG. 12.

FIG. 13 depicts an illustrative block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 12.

In at least one example, the server(s) 1304 can correspond to the server computing device(s) 404 described above with reference to FIG. 4. In at least one example, the network(s) 1306 can correspond to the network(s) 408 described above with reference to FIG. 4. Furthermore, in at least one example, the user device 1302 can correspond to the user computing device 402 described above with reference to FIG. 4.

In at least one example, the system 1300 can facilitate identity verification using payment instrument(s), as described herein. In an example, an identifier corresponding to a user can be associated with a microchip embedded in a payment instrument, such as a credit card or debit card, or otherwise associated with a secure storage of a payment instrument. The identifier can be a user-designated identifier, a private key, a U2F identity credential, or the like. A verifying entity—which can be a computing resource (e.g., an application, a web page, etc.) and/or server(s) 1304 associated with a service provider (or third-party server computing device(s))—can receive a request to access the computing resource availed via a computing device operable by the user, such as one of the user computing devices 1302. The verifying entity can determine whether to grant the user access to the computing resource based on receiving the identifier and/or an indication of the identifier via an interaction between the payment instrument and a reader device associated with the computing resource. For example, the verifying entity can receive the identifier and/or an indication of the identifier via an interaction between the payment instrument and the reader device and, if the identifier corresponds to the user (e.g., the identifier is associated with a profile storing identification information of the user), the verifying entity can verify the identity of the user and grant the user access to the computing resource.

The system 1300 can therefore enable payment instruments—such as credit cards and/or debit cards—to be used as security keys. That is, in multi-factor authentication, users can present payment instruments-which securely store information that is personal to the users (e.g., user-designated identifiers, private keys, U2F identity credentials, etc.)—as a factor for authentication. As such, techniques described herein enable users to protect themselves against thieves and/or malicious actors seeking to steal or improperly obtain information associated with such users. By enabling users to use payment instruments—which are regularly carried around by users-instead of conventional U2F hardware tokens, techniques described herein offer improvements to existing verification technology.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface (s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, modules or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include computing resource(s) 1320 to enable users to interact with the user device 1302, and thus the server(s) 1304 and/or other networked devices. In at least one example, the computing resource(s) 1320 can be web page(s) presented via web browser(s), or the like. In other examples, the computing resource(s) 1320 can application(s), such as a mobile application or desktop application, which can be provided by a service provider 1212 associated with the server(s) 1304, or which can be an otherwise dedicated application. In some examples, the computing resource(s) 1320 can correspond to the computing resource(s) 410 described above with reference to FIG. 4. In at least one example, a user can interact with the user interface via touch input, spoken input, gesture, or any other type of input. The word "input" is also used to describe "contextual" input that may not be directly provided by the user via a user interface associated with a computing resource of the computing resource(s) 1320. For example, user's interactions with the user interface(s) presented via the computing resource(s) 1320 are analyzed using, e.g., natural language processing techniques, to determine context or intent of the user, which may be treated in a manner similar to "direct" user input.

Depending on the type of the user device 1302, the computer-readable media 1310 can also optionally include other functional components and data, such as other modules and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1212, described above, to provide one or more services. That is, in some examples, the service provider 1212 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1214 and/or for sending users 1214 notifications regarding available appointments with seller(s) located proximate to the users 1214. In at least one example, location can be used for taking payments from nearby buyers when they leave a geofence, or location can be used to initiate an action responsive to users 1214 enter a brick-and-mortar store of a seller. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV reader device, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a buyer slides a card having a magnetic strip through a reader device that captures payment data contained in the magnetic strip), a dip (i.e., a card-present transaction where a buyer inserts a card having an embedded microchip (i.e., chip) into a reader device first until the reader device prompts the buyer to remove the card), or a tap (i.e., a card-present transaction where a buyer may tap or hover his or her electronic device such as a smart phone running a payment application over a reader device to complete a transaction via short-range communication) to obtain payment data associated with a buyer. Additionally or optionally, the reader device 1326 may also include a biometric sensor to receive and process biometric characteristics and process them as payment instruments, given that such biometric characteristics are registered and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more modules and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one module for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 136, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the buyer, an address of the buyer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the buyer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single seller or enterprise, or can be provided by the servers and/or services of multiple different buyers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program modules, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider 1212 and/or payment processing service. Functional components stored in the computer-readable media 1330 can optionally include a seller module 1336, a training module 1338, and one or more other modules and data 1340.

The seller module 1336 can be configured to receive transaction data from POS systems, such as the POS system 1224 described above with reference to FIG. 12. The seller module 1336 can transmit requests (e.g., authorization, capture, settlement, etc.) to payment service server computing device(s) to facilitate POS transactions between sellers and buyers. The seller module 1336 can communicate the successes or failures of the POS transactions to the POS systems.

The training module 1338 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1302 and/or the server(s) 1304 for use at a time after the data models have been trained (e.g., at runtime).

The one or more other modules and data 1340 can include the identifier management module 418 and the verification module 420, the functionality of which is described, at least partially, above. Further, the one or more other modules and data 1340 can include programs, drivers, etc., and the data used or generated by the functional components. Further, the server(s) 1304 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include seller profiles, buyer profiles, and so on.

Seller profiles can store, or otherwise be associated with, data associated with sellers. For instance, a seller profile can store, or otherwise be associated with, information about a seller (e.g., name of the seller, geographic location of the seller, operating hours of the seller, employee information, etc.), a seller category classification (MCC), item(s) offered for sale by the seller, hardware (e.g., device type) used by the seller, transaction data associated with the seller (e.g., transactions conducted by the seller, payment data associated with the transactions, items associated with the transactions, descriptions of items associated with the transactions, itemized and/or total spends of each of the transactions, parties to the transactions, dates, times, and/or locations associated with the transactions, etc.), loan information associated with the seller (e.g., previous loans made to the seller, previous defaults on said loans, etc.), risk information associated with the seller (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, buyer service data, etc. The seller profile can securely store bank account information as provided by the seller. Further, the seller profile can store payment information associated with a payment instrument linked to a stored balance of the seller, such as a stored balance maintained in a ledger by the service provider 1212.

Buyer profiles can store buyer data including, but not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, buyer service data, etc.

In at least one example, the account(s) 118, described above with reference to FIG. 1, can include or be associated with the seller profiles and/or buyer profiles described above.

Furthermore, in at least one example, the datastore 1344 can store inventory database(s) and/or catalog database(s). As described above, an inventory can store data associated with a quantity of each item that a seller has available to the seller. Furthermore, a catalog can store data associated with items that a seller has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

EXAMPLE CLAUSES

A. A method, implemented by at least one computing device, for using a near-field communication (NFC) payment card for identity verification in an application executing on a user computing device of a user, the method comprising: receiving, by the application, a request to access a computing resource of the application, wherein the request includes an identity of the user; prompting, by the application and responsive to receiving the request to access the computing resource, the user to cause an interaction between the NFC payment card and an NFC reader device integrated into the user computing device; receiving, by the application and responsive to prompting the user, an identifier from the NFC reader device, wherein the identifier is received by the NFC reader device during the interaction between the NFC payment card and the NFC reader device, and the identifier is generated based at least in part by causing a Universal 2nd Factor (U2F) applet in a microchip embedded in the NFC payment card to generate an identifier associated with the user; and granting, by the application and based on determining that the identifier corresponds to the user, the user access to the computing resource of the application.

B. The method as clause A recites, wherein the NFC payment card is a Europay Mastercard Visa (EMV) card, and the interaction comprises a tap.

C. The method as clause A or B recites, further comprising sending, to the NFC reader device and responsive to receiving the request to access the computing resource, an instruction identifying the U2F applet, wherein the NFC reader device sends another instruction to the NFC payment card specifying the U2F applet.

D. A system comprising: one or more processors; one or more non-transitory computer-readable media storing instructions, that when executed by the one or more processors, cause the system to perform operations comprising: associating an identifier with a secure storage component of a payment instrument of a user, wherein the identifier is associated with the user; receiving a request to access a computing resource availed via a computing device operable by the user; and determining whether to grant the user access to the computing resource based at least in part on receiving the identifier via an interaction between the payment instrument and a reader device associated with the computing device.

E. The system as clause D recites, wherein the reader device is integrated into the computing device, and the interaction comprises a swipe, a dip, or a tap.

F. The system as clause D or E recites, wherein the reader device is communicatively coupled to the computing device, and the interaction comprises a swipe, a dip, or a tap.

G. The system as any of clauses D-F recites, wherein the payment instrument is a near-field communication (NFC) payment card and the reader device is an NFC reader device.

H. The system as any of clauses D-G recites, wherein determining whether to grant the user access to the computing resource comprises: prompting, responsive to receiving the request to access the computing resource, the user to cause an interaction between the payment instrument and the reader device; receiving, in response to prompting the user, the identifier; and determining whether the identifier corresponds to the user, wherein the request is associated with an identity of the user.

I. The system as clause H recites, wherein the computing resource determines whether the identifier corresponds to the user.

J. The system as clause H or I recites, wherein the system comprises one or more server computing devices associated with a service provider of the computing resource and the request to access the computing resource is received by the computing resource, the operations further comprising: sending, responsive to receiving the request to access the computing resource, the request to the one or more server computing devices; receiving, by the computing resource, a verification request from the one or more server computing devices, wherein the prompting the user is further responsive to the verification request; receiving, by the computing resource, the identifier from the reader device associated with the computing device; sending, from the computing resource, the identifier to the one or more server computing devices, wherein the one or more server computing devices determine whether the identifier corresponds to the user; and receiving, by the computing resource, a verification response from the one or more server computing devices, wherein determining whether to grant the user access to the computing resource is further based at least in part on the verification response.

K. The system as any of clauses H-J recites, wherein the payment instrument is a Europay Mastercard Visa (EMV) card associated with an actuation mechanism, the operations further comprising: receiving an indication that the actuation mechanism is actuated in association with the interaction between the payment instrument and the reader device; and determining whether the identifier corresponds to the user based at least in part on receiving the indication that the actuation mechanism is actuated in association with the interaction between the payment instrument and the reader device.

L. The system as any of clauses D-K recites, wherein the identifier is designated by the user prior to associating the identifier with the secure storage component of the payment instrument.

M. The system as any of clauses D-L recites, wherein the identifier is associated with a private key, the operations further comprising: receiving data signed by the private key from the reader device; and determining whether to grant the user access to the computing resource based at least in part on determining whether the data is signed by the private key.

N. The system as any of clauses D-M recites, wherein the identifier comprises a Universal $2^{nd}$ Factor (U2F) identity credential derived from a U2F applet associated with the payment instrument.

O. The system as any of clauses D-N recites, the operations further comprising sending, to the reader device and responsive to receiving the request to access the computing resource, an instruction identifying an applet storing the identifier, wherein the reader device sends another instruction to the payment instrument specifying the applet.

P. One or more non-transitory computer-readable media storing instructions, that when executed by one or more processors, cause the one or more processors to perform operations comprising: associating an identifier with a secure storage component of a payment instrument of a user, wherein the identifier is associated with the user; receiving a request to access a computing resource availed via a computing device operable by the user; and determining whether to grant the user access to the computing resource based at least in part on an interaction between the payment instrument and a reader device associated with the computing device.

Q. The one or more non-transitory computer-readable media as clause P recites, wherein determining whether to grant the user access to the computing device comprises: prompting, responsive to receiving the request to access the computing resource, the user to cause an interaction between the payment instrument and the reader device; receiving, in response to prompting the user, the identifier; and determining whether the identifier corresponds to the user.

R. The one or more non-transitory computer-readable media as clause Q recites, wherein the identifier is read by the reader device during the interaction between the payment instrument and the reader device.

S. The one or more non-transitory computer-readable media as clause Q or R recites, wherein the identifier is determined by the reader device based at least in part on the interaction between the payment instrument and the reader device.

T. The one or more non-transitory computer-readable media as any of clauses P-S recites, wherein the identifier comprises: a user-designated identifier; a private key; or a Universal $2^{nd}$ Factor (U2F) identity credential derived from a U2F applet.

While the example clauses described above are described with respect to one particular implementation, it should be understood that, in the context of this document, the content of the example clauses can also be implemented via a method, device, system, a computer-readable medium, and/or another implementation. Additionally, any of clauses A-T may be implemented alone or in combination with any other one or more of the clauses A-T.

I claim:

1. A method, implemented by at least one computing device, for using a payment card for identity verification in an application executing on a user computing device of a user, the method comprising:
   downloading a software layer configured to be utilized by a reader device to access an identifier from the payment card, the software layer, when downloaded, causing the reader device to translate payment protocol data from the payment card to security key protocol data;
   receiving, by the application, a request to access a computing resource of the application, wherein the request includes an identity of the user;
   prompting, by the application and responsive to receiving the request to access the computing resource, the user to cause an interaction between the payment card and the reader device integrated into the user computing device;
   determining that the payment card is predefined payment card type;
   causing, based at least in part on the payment card being the predefined payment card type, the software layer to translate data received from the payment card from a payment protocol to a security key protocol such that an identifier is identified in the security key protocol data, wherein causing the software layer to translate the data includes converting the data received from the payment card from a first data syntax of the payment protocol to a second data syntax of the security key protocol, the payment protocol being unassociated with determining the identifier;
   determining that the identifier from the reader device corresponds to the user based at least in part on a comparison of the identifier with information associated with the user that is stored locally on the at least one computing device; and
   granting, by the application and based on determining that the identifier corresponds to the user, the user access to the computing resource of the application, wherein granting the user access to the computing resource comprises at least enabling the user computing device to utilize functionality of the application previously unavailable to the user computing device.

2. The method as claim 1, recites, wherein the identifier is associated with a private key, the method further comprising:
   receiving data signed by the private key from the reader device; and determining to grant the user access to the computing resource based at least in part on determining the data is signed by the private key.

3. The method as claim 1 recites, wherein the payment card is a Europay Mastercard Visa (EMV) card associated with an actuation mechanism, the method further comprising:

receiving an indication that the actuation mechanism is actuated in association with the interaction between the payment card and the reader device; and determining whether the identifier corresponds to the user based at least in part on receiving the indication that the actuation mechanism is actuated in association with the interaction between the payment card and the reader device.

4. The method as claim 1 recites, wherein causing the software layer to translate the data comprises translating a payment card identifier of the payment card to a security key.

5. The method as claim 1 recites, wherein causing the software layer to translate the data comprises translating a payment card identifier of the payment card to the identifier.

6. The method as claim 1 recites, wherein causing the software layer to translate the data comprises translating a payment card identifier of the payment card to Universal $2^{nd}$ Factor data.

7. A system comprising:

one or more processors; and one or more non-transitory computer-readable media storing instructions, that when executed by the one or more processors, cause the system to perform operations comprising:

associating an identifier with a payment instrument of a user, wherein the identifier is associated with the user;

downloading a software layer configured to be utilized by a reader device to access an identifier from the payment instrument, the software layer, when downloaded, causing the reader device to translate payment protocol data from the payment instrument to security key protocol data;

receiving, by an application associated with a computing device operable by the user, a request to access a computing resource availed via the computing device;

receiving, by the application, data from the payment instrument;

causing, based at least in part on the payment instrument being a predefined payment instrument type, the software layer to translate the data from a payment protocol to a security key protocol such that the identifier is identified in the security key protocol data, wherein causing the software layer to translate the data includes converting the data received from the payment instrument from a first data syntax of the payment protocol to a second data syntax of the security key protocol, the payment protocol being unassociated with determining the identifier; and granting, by the application, the user access to the computing resource based at least in part on the identifier as received from the payment instrument being associated with the user, wherein granting the user access to the computing resource comprises at least enabling the computing device to utilize functionality of the application previously unavailable to the computing device.

8. The system as claim 7 recites, wherein the reader device is integrated into the computing device.

9. The system as claim 7 recites, wherein the reader device is communicatively coupled to the computing device.

10. The system as claim 7 recites, wherein determining to grant the user access to the computing resource comprises:

prompting, responsive to receiving the request to access the computing resource, the user to cause an interaction between the payment instrument and the reader device;

receiving, in response to prompting the user, the data; and determining the identifier corresponding to the user, wherein the request is associated with an identity of the user.

11. The system as claim 10 recites, wherein the computing resource determines that the identifier corresponds to the user by comparing the identifier with a profile of the user stored on the computing device.

12. The system as claim 10 recites, wherein the payment instrument is a Europay Mastercard Visa (EMV) card associated with an actuation mechanism, the operations further comprising:

receiving an indication that the actuation mechanism is actuated in association with the interaction between the payment instrument and the reader device; and determining that the identifier corresponds to the user based at least in part on receiving the indication that the actuation mechanism is actuated in association with the interaction between the payment instrument and the reader device.

13. The system as claim 10 recites, wherein the identifier is designated by the user prior to associating the identifier with the payment instrument.

14. The system as claim 10 recites, wherein the identifier is associated with a private key, the operations further comprising:

receiving data signed by the private key from the reader device; and determining to grant the user access to the computing resource based at least in part on determining that the data is signed by the private key.

15. One or more non-transitory computer-readable media storing instructions, that when executed by one or more processors, cause the one or more processors to perform operations comprising:

associating an identifier with a payment instrument of a user, wherein the identifier is associated with the user;

downloading a software layer to a reader device, the software layer configured to be utilized by a reader device to access the identifier from the payment instrument, the software layer, when downloaded, causing the reader device to translate payment protocol data from the payment instrument to security key protocol data;

receiving, by an application associated with a computing device operable by the user, a request to access a computing resource availed via the computing device;

receiving, by the application and from the reader device, data from the payment instrument;

causing, based at least in part on the payment instrument being a predefined payment instrument type, the software layer to translate the data from a payment protocol to a security key protocol such that the identifier is identified in the security key protocol data, wherein causing the software layer to translate the data includes converting the data received from the payment instrument from a first data syntax of the payment protocol to a second data syntax of the security key protocol, the payment protocol being unassociated with determining the identifier; and granting the user access to the computing resource based at least in part on the identifier, wherein granting the user access to the computing resource comprises at least enabling the computing device to utilize functionality of the application previously unavailable to the computing device.

16. The one or more non-transitory computer-readable media as claim 15 recites, wherein determining to grant the user access to the computing device comprises:

prompting, responsive to receiving the request to access the computing resource, the user to cause an interaction between the payment instrument and the reader device;

receiving, in response to prompting the user, the identifier; and determining that the identifier corresponds to the user.

17. The one or more non-transitory computer-readable media as claim 16 recites, wherein the identifier is read by the reader device during the interaction between the payment instrument and the reader device.

18. The one or more non-transitory computer-readable media as claim 16 recites, wherein the identifier is determined by the reader device based at least in part on the interaction between the payment instrument and the reader device.

19. The one or more non-transitory computer-readable media as claim 15 recites, wherein the identifier comprises:

a user-designated identifier; or a private key.

20. The one or more non-transitory computer-readable media as claim 15 recites, wherein causing the software layer to translate the data comprises translating a payment instrument identifier of the payment instrument to Universal $2^{nd}$ Factor data.

* * * * *